(12) United States Patent
Kogure et al.

(10) Patent No.: US 7,302,573 B2
(45) Date of Patent: Nov. 27, 2007

(54) COMPUTER SYSTEM AND METHOD FOR CONTROLLING OUTPUT OF REPRODUCED VIDEO DATA

(75) Inventors: Nakaba Kogure, Zama (JP); Tomoo Yamakage, Yokohama (JP); Hidenori Takeshima, Ebina (JP); Koichi Masukura, Kawasaki (JP); Taku Kato, Fuchu (JP); Atsushi Ishihara, Yokohama (JP); Wataru Asano, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 869 days.

(21) Appl. No.: 10/755,235

(22) Filed: Jan. 13, 2004

(65) Prior Publication Data

US 2004/0194126 A1 Sep. 30, 2004

(30) Foreign Application Priority Data

Jan. 14, 2003 (JP) ............................. 2003-006182
Jun. 10, 2003 (JP) ............................. 2003-165680

(51) Int. Cl.
*H04L 9/00* (2006.01)

(52) U.S. Cl. ............... 713/175; 713/176; 380/201; 380/216; 380/52

(58) Field of Classification Search ............... 713/175, 713/176; 380/201
See application file for complete search history.

(56) References Cited

U.S. PATENT DOCUMENTS 5,825,879 A * 10/1998 Davis ....................... 380/216
6,064,739 A * 5/2000 Davis ....................... 380/200
6,148,400 A * 11/2000 Arnold ...................... 713/168
6,469,743 B1 * 10/2002 Cheney et al. .............. 348/553
2004/0194126 A1 9/2004 Kogure et al.

FOREIGN PATENT DOCUMENTS

JP 2001-16538 1/2001

OTHER PUBLICATIONS

U.S. Appl. No. 11/467,804, filed Aug. 28, 2006, Kogure, et al.

* cited by examiner

*Primary Examiner*—Gilberto Barron, Jr.
*Assistant Examiner*—Samson Lemma
(74) *Attorney, Agent, or Firm*—Oblon, Spivak, McClelland, Maier & Neustadt, P.C.

(57) ABSTRACT

A computer system with a monitor display, comprises a decoder unit configured to decode video data containing digital watermark information to derive decoded data, and configured to determine, based on information included in the video data, whether or not first certification for certifying that the video data is legitimately reproduced data succeeds, and a graphics controller which determines, using the digital watermark information, whether or not second certification for certifying that the video data is to be protected from being copied succeeds, the graphics controller converting the decoded data into a protected decoded data from being copied and outputting the protected decoded data to the monitor display if the first certification and the second certification succeed, and the graphics controller inhibiting the decoded data from being output to the monitor display if the first certification fails and the second certification succeeds.

28 Claims, 18 Drawing Sheets

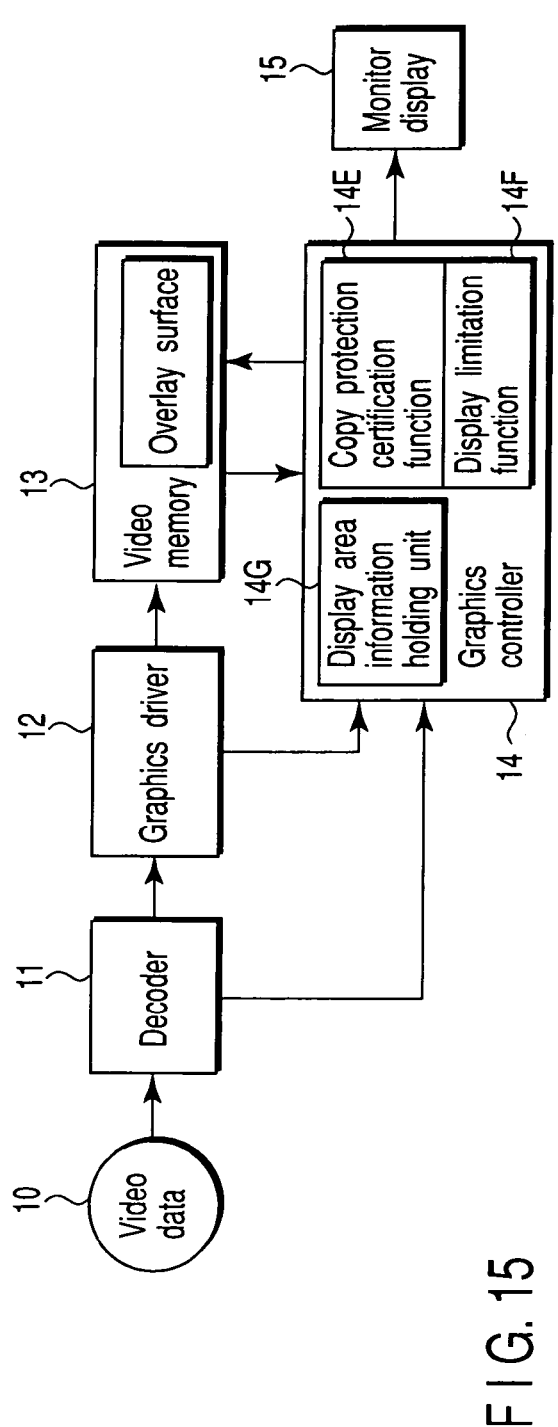
F I G. 15
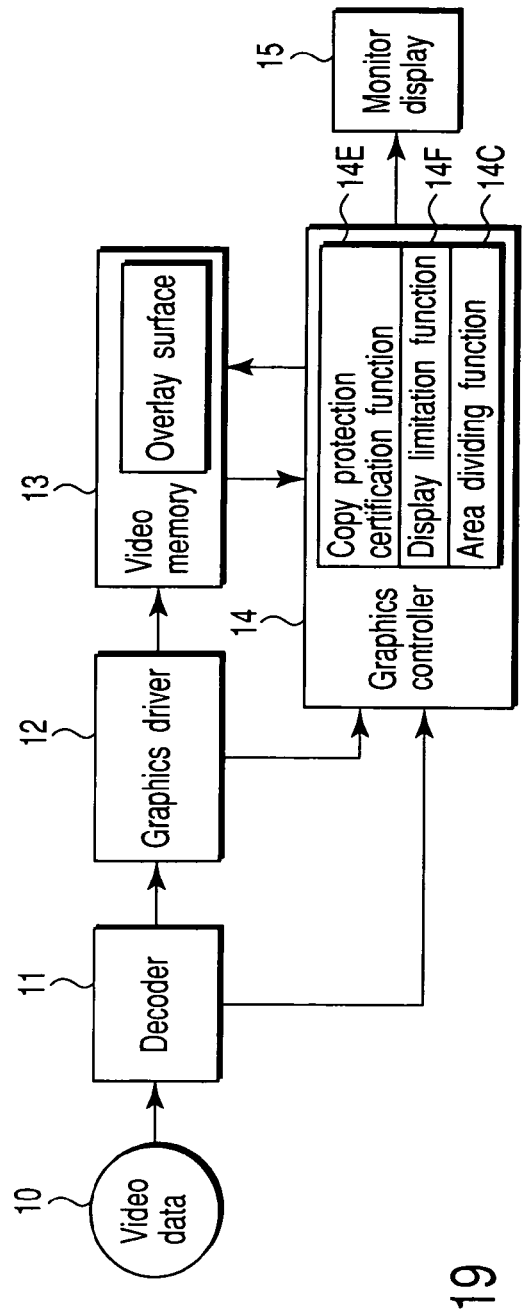
F I G. 19

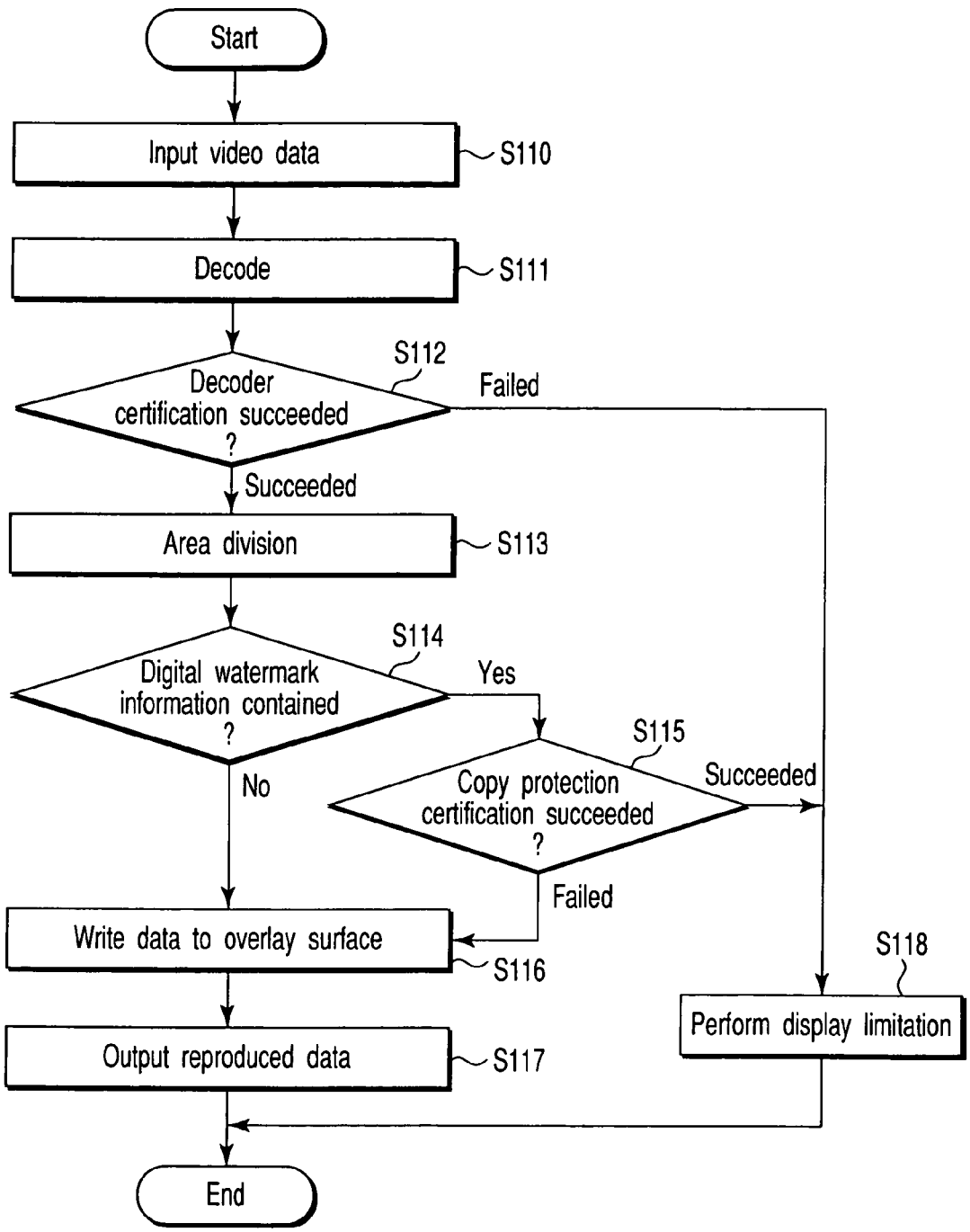
F I G. 20

COMPUTER SYSTEM AND METHOD FOR CONTROLLING OUTPUT OF REPRODUCED VIDEO DATA

CROSS-REFERENCE TO RELATED APPLICATIONS

This application is based upon and claims the benefit of priority from the prior Japanese Patent Applications No. 2003-006182, filed Jan. 14, 2003; and No. 2003-165680, filed Jun. 10, 2003, the entire contents of both of which are incorporated herein by reference.

BACKGROUND OF THE INVENTION

1. Field of the Invention

The present invention relates to a computer system having a function for reproducing and outputting video data recorded on a medium, such as a DVD, using a monitor display. More particularly, it relates to a computer system capable of preventing, for example, copyright video programs from being illegally copied, and a method, employed in the computer system, for controlling the output of reproduced video data.

2. Description of the Related Art

In accordance with recent development of computer and multimedia techniques, so-called multimedia compatible personal computers have been widely put to practical use. Personal computers of this type have a function for reproducing video data (moving picture data) recorded on a medium such as a digital versatile disc (DVD), as well as text data and graphics data.

Video data recorded on a DVD is encoded based on the moving picture experts group (MPEG) phase 2 standard. To reproduce such MPEG-2 video data on a personal computer, an encoded stream of the video data is first read from a DVD drive into the main storage of the personal computer, and then transferred to an MPEG-2 decoder that is realized by software or hardware, under the control of a video reproduction application program. The MPEG-2 decoder performs decoding (decompress) of the coded stream.

The decoded data is once written into a video memory and then displayed on a monitor display, as in the case of standard graphics data provided by an operating system (OS) or an application program. In personal computers equipped with a GUI system, there is a case where a window (overlay surface) is assigned for each application program, and a case where video data is directly written to a video frame memory for display.

In response to strong requests from copyright owners who provide, for example, video software, a number of schemes for preventing illegal copying of video software have been proposed. For example, the Macrovision system developed by the US Macrovision company is the most popular copy protection technique employed in, for example, home VTRs (mainly, for VHS titles). However, no copy protection techniques have yet been established for protecting the video output to the monitor display of a personal computer from copying.

Jpn. Pat. Appln. KOKAI Publication No. 2001-16538, for example, has proposed a structure in which a copy protect function is imparted to a graphics controller, and an interface for executing the Macrovision function is provided in a graphics driver. This publication has also proposed a method in which the Macrovision function is activated for video data whose copying is to be prevented (i.e., where the data contains copy protection information) when the video data is decoded, thereby outputting, to a TV monitor, video data whose copying is to be prevented. This method, however, realizes copy protection for a TV monitor, but does not realize copy protection for a computer display.

In existing video applications, such as DVDs and digital broadcasting, copy protection information is represented by a flag belonging to the MPEG-2 stream. In the field of computers, programs for illegally altering the flag exist. To cope with this, a scheme for superimposing, on video data, copy protection information as digital watermark information is now being developed.

Since conventional personal computers do not have a function for protecting the output to the monitor display from being copied, video data recorded on a DVD and output to the monitor display of a computer is not protected from being copied, regardless of whether the video data contains copy protection information. Copy protection information contained in video data may be illegally copied by software. Further, in conventional personal computers, no consideration is made for the case where a plurality of video reproduction applications have different copy control information items.

BRIEF SUMMARY OF THE INVENTION

It is an object of the invention to provide a computer system having a function for protecting the output to the computer monitor display from being copied if the output contains copy protection information, and also to provide a method for controlling the output of reproduced video data, employed in the computer system for realizing the function.

According to a first aspect of the invention, there is provided a computer system with a monitor display, comprising:

a decoder unit configured to decode video data containing digital watermark information to derive decoded data, and configured to determine, based on information included in the video data, whether or not first certification for certifying that the video data is legitimately reproduced data succeeds; and a graphics controller which determines, using the digital watermark information, whether or not second certification for certifying that the video data is to be protected from being copied succeeds, the graphics controller converting the decoded data into a protected decoded data from being copied and outputting the protected decoded data to the monitor display if the first certification and the second certification succeed, and the graphics controller inhibiting the decoded data from being output to the monitor display if the first certification fails and the second certification succeeds.

According to a second aspect of the invention, there is provided a method of controlling output of reproduced video data, comprising: decoding video data containing digital watermark information to derive decoded data; determining, based on information included in the video data, whether or not first certification for certifying that the video data has been reproduced by a legitimate route succeeds; forming a video display area in a video memory at a position corresponding to the video data, the video display area storing the decoded data; determining, using the digital watermark information, whether or not second certification for certifying that the video data is to be protected from being copied succeeds, if the video display area is formed; converting the decoded data into a protected decoded data from being copied and writing the protected decoded data in the video display area if the first certification and the second certification succeed, and inhibiting the decoded data from being written in the video display area if the first certification fails and the second certification succeeds; and outputting, to a monitor display for reproduction, the protected decoded data stored in the video display area in the video memory.

According to a third aspect of the invention, there is provided a method of controlling output of reproduced video data to a monitor display, comprising: decoding video data containing digital watermark information to derive decoded data; determining, based on information included in the video data, whether or not first certification for certifying that the video data has been reproduced by a legitimate route succeeds; dividing a screen of the monitor display into a plurality of areas; determining, for each of the areas using the digital watermark information, whether or not second certification for certifying that the video data is to be protected from being copied succeeds; and converting the decoded data into a protected decoded data from being copied and outputting the protected decoded data to the monitor display if the first certification and the second certification succeed, and inhibiting the decoded data from being output to the monitor display if the first certification fails and the second certification succeeds.

According to a fourth aspect of the invention, there is provided a method of controlling output of reproduced video data to a monitor display, comprising: decoding video data containing digital watermark information to derive decoded data; determining, based on information included in the video data, whether or not first certification for certifying that the video data has been reproduced by a legitimate route succeeds; recognizing a plurality of windows on a screen of the monitor display; determining, for each of recognized windows using the digital watermark information, whether or not second certification for certifying that the video data is to be protected from being copied succeeds; and converting the decoded data into a protected decoded data from being copied and outputting the protected decoded data to the monitor display if the first certification and the second certification succeed, and inhibiting the decoded data from being output to the monitor display if the first certification fails and the second certification succeeds.

According to a fifth aspect of the invention, there is provided a method of controlling output of reproduced video data to a monitor display, comprising: decoding video data containing digital watermark information to derive decoded data; determining, based on information included in the video data, whether or not first certification for certifying that the video data has been reproduced by a legitimate route succeeds; hooking an imaging instruction API (Application Programming Interface) to be transferred from an operating system to a graphics driver, the hooked imaging instruction API corresponding to the video data; determining whether or not second certification for certifying that the video data is to be protected from being copied succeeds, using the digital watermark information; and converting the decoded data into a protected decoded data from being copied and outputting the protected decoded data to the monitor display if the first certification and the second certification succeed, and inhibiting the decoded data from being output to the monitor display if the first certification fails and the second certification succeeds.

According to a sixth aspect of the invention, there is provided a computer system with a monitor display, comprising:

a decoder unit configured to decode video data to derive decoded data and configured to determine, based on information included in the video data, whether or not first certification for certifying that the video data is legitimately reproduced data succeeds; and a graphics controller which determines whether or not the video data contains digital watermark information if the first certification succeeds, the graphics controller determining, using the digital watermark information, whether or not second certification for certifying that the video data is to be protected from being copied succeeds, the graphics controller outputting decoded data to the monitor display in success of the first certification and failure of the second certification, and the graphics controller limiting a manner of displaying the decoded data on the monitor display in one of failure of the first certification and success of the second certification.

According to a seventh aspect of the invention, there is provided a method of controlling output of reproduced video data to a monitor display, comprising: decoding video data to derive decoded data; determining, based on information included in the video data, whether or not first certification for certifying that the video data has been reproduced by a legitimate route succeeds; limiting a manner of displaying the decoded data on the monitor display if the first certification fails; determining whether or not the video data contains digital watermark information, if the first certification succeeds; forming a video display area on a video memory at a position corresponding to the video data, the video display area storing the decoded data; writing the decoded data in the video display area if the video data fails to contain the digital watermark information; determining, using the digital watermark information, whether or not second certification for certifying that the video data is to be protected from being copied succeeds, if the video data contains the digital watermark information; writing the decoded data in the video display area if the second certification fails; limiting a manner of writing the decoded data in the video display area if the second certification succeeds; and outputting, to the monitor display for reproduction, the decoded data stored in the video display area.

According to an eighth aspect of the invention, there is provided a method of controlling output of reproduced video data to a monitor display, comprising: decoding video data to derive decoded data; determining, based on information included in the video data, whether or not first certification for certifying that the video data has been reproduced by a legitimate route succeeds; limiting a manner of displaying the decoded data on the monitor display if the first certification fails; dividing a screen of the monitor display into a plurality of areas if the first certification succeeds; determining, for each of the areas, whether or not the video data contains digital watermark information; outputting the decoded data to the monitor display if the video data fails to contain the digital watermark information; determining, for each of the areas using the digital watermark information, whether or not second certification for certifying that the video data is to be protected from being copied succeeds, if the video data contains the digital watermark information; outputting the decoded data to the monitor display for reproduction if the second certification fails; and limiting a manner of displaying the decoded data on the monitor display if the second certification succeeds.

According to a ninth aspect of the invention, there is provided a method of controlling output of reproduced video data to a monitor display, comprising: decoding video data to derive decoded data; determining, based on information included in the video data, whether or not first certification for certifying that the video data has been reproduced by a legitimate route succeeds; limiting a manner of displaying the decoded data on the monitor display if the first certification fails; recognizing a plurality of windows on a screen of the monitor display if the first certification succeeds; determining, for each of the recognized windows, whether or not the video data contains digital watermark information; outputting the decoded data to the monitor display if the video data fails to contain the digital watermark information; determining, for each of the recognized windows using the digital watermark information, whether or not second certification for certifying that the video data is to be protected from being copied succeeds, if the video data contains the digital watermark information; outputting the decoded data to the monitor display for reproduction if the second certification fails; and limiting a manner of displaying the decoded data on the monitor display if the second certification succeeds.

According to a tenth aspect of the invention, there is provided a method of controlling output of reproduced video data to a monitor display, comprising: decoding video data to derive decoded data; determining, based on information included in the video data, whether or not first certification for certifying that the video data has been reproduced by a legitimate route succeeds; limiting a manner of displaying the decoded data on the monitor display if the first certification fails; hooking an imaging instruction API (Application Programming Interface) transferred from an operating system to a graphics driver, if the first certification succeeds; determining whether or not the video data contains digital watermark information; outputting the decoded data to the monitor display if the video data fails to contain the digital watermark information; determining, using the digital watermark information, whether or not second certification for certifying that the video data corresponding to the hooked imaging instruction API is to be protected from being copied succeeds, if the video data contains the digital watermark information; outputting the decoded data to the monitor display for reproduction if the second certification fails; and limiting a manner of displaying the decoded data on the monitor display if the second certification succeeds.

BRIEF DESCRIPTION OF THE SEVERAL VIEWS OF THE DRAWING

FIG. 15 is a block diagram illustrating the configuration of a computer system according to a fifth embodiment of the invention;

FIG. 19 is a block diagram illustrating the configuration of a computer system according to a sixth embodiment of the invention;

FIG. 20 is a flowchart illustrating the procedure of output control of reproduced video data in the sixth embodiment;

DETAILED DESCRIPTION OF THE INVENTION

FIRST EMBODIMENT

Figure 1:
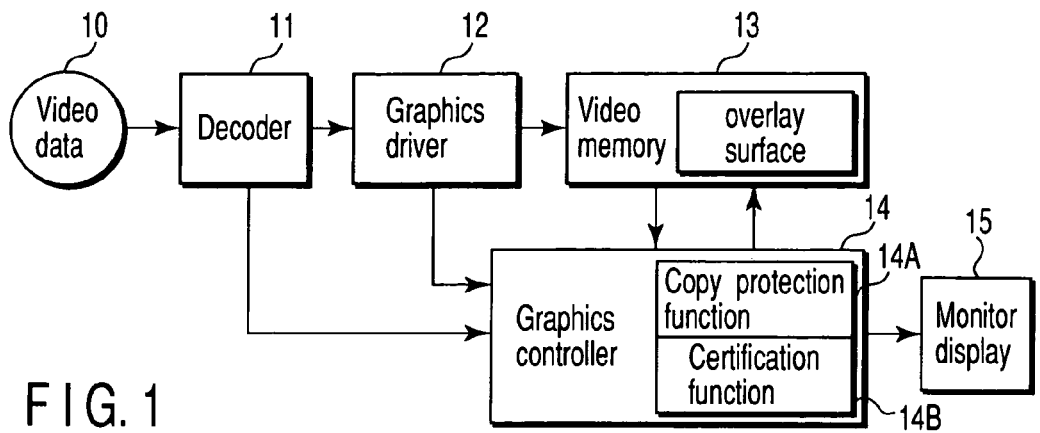
FIG. 1 is a block diagram illustrating the configuration of a computer system according to a first embodiment of the invention.

FIG. 1 is a block diagram illustrating the part of a computer system that relates to video reproduction and accords to a first embodiment of the invention. This computer system comprises a decoder 11 for decoding video data 10, graphics driver 12, video memory 13, and graphics controller 14 activated by the graphics driver 12, and performs control for outputting reproduced video data to a monitor display 15, using the graphics controller 14.

The video data 10 is data compressed on the basis of, for example, the MPEG-2 standard, and is reproduced as an encoded stream from a DVD by a DVD drive under the control of a video reproduction application program. The video data 10 contains copy protection information that constitutes digital watermark information. The reproduced video data 10 is decoded by the decoder 11. The decoder 11 is, for example, an MPEG-2 decoder, which is realized only by hardware, or using software such as video reproduction application program. In this embodiment, the decoder 11 also has a certification function for certifying whether or not the input video data 10 has been reproduced through a legitimate reproduction route (this certification will hereinafter be referred to as "decoder certification").

The decoded data output from the decoder 11 is transferred to the video memory 13 via the operating system and graphics driver 12. The data transferred to the video memory 13 is written to a video data display area generated in the video memory 13 (this area is generally called an overlay surface or video frame buffer, but will be referred to as the "overlay surface" in the description below).

The graphics controller 14 reads the data to be displayed and written to the overlay surface of the video memory 13, and displays it on the monitor display 15. The data written to the overlay surface is displayed on, for example, a video data reproduction window assigned by a window manager to the video data reproduction program, if the computer system of the embodiment is equipped with a window system in which a window is assigned to each application program.

In the embodiment, the graphics controller 14 has a copy protection function 14A and certification function 14B. When an overlay surface is generated in the video memory 13, the graphics controller 14 performs certification (which is hereinafter referred to as "copy protection certification") as to whether or not the video data 10 is copy-prevented data, i.e., whether or not the video data 10 contains digital watermark information. If the copy protection certification has succeeded, i.e., if it is determined that the video data 10 is copy-prevented data, the graphics controller 14 requests the decoder 11 of the above-mentioned decoder certification.

If the decoder certification has succeeded, the graphics controller 14 determines that the video data 10 has been reproduced through a legitimate reproduction route. The controller 14 then performs copy protection processing on the data decoded by the decoder 11 and supplied via the graphics driver 12, writes the resultant data to the overlay surface of the video memory 13, and outputs it to the monitor display 15. On the other hand, if the decoder certification has failed, the graphics controller 14 determines that the video data 10 is reproduced by an illegitimate reproduction route, writes no data to the overlay surface, and inhibits the output of the decoded data to the monitor display 15.

When the computer assigns a window to each application program for video data reproduction, the process of synthesizing an image using the overlay surface is included in the reproduction procedure. When an overlay surface is generated in the video memory 13, the graphics controller 14 performs copy protection certification and refers to the result of decoder certification made by the decode 11. After that, the controller 14 performs copy protection processing on the video data that contains copy protection information, and then outputs the resultant data to the monitor display 15. Thus, copy protection can be performed effectively.

The operation of the graphics controller 14 will now be described roughly.

Figure 2:
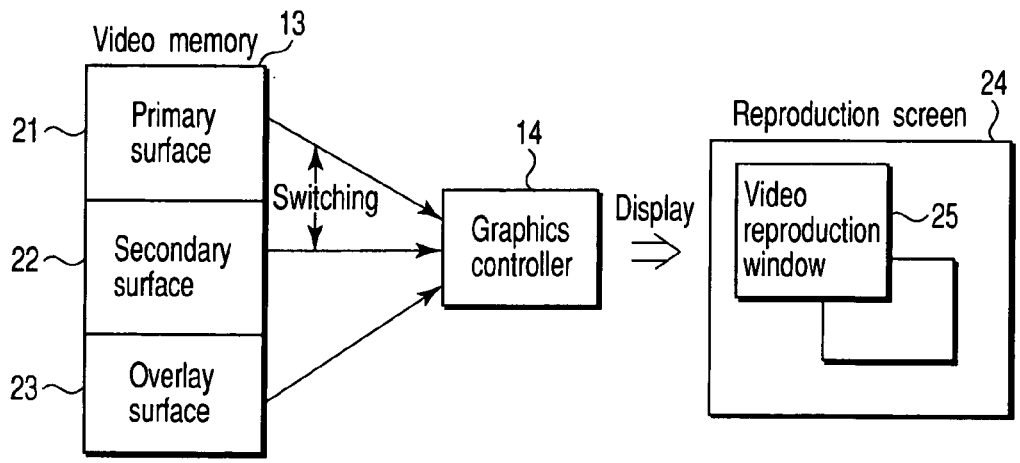
FIG. 2 is a block diagram useful in explaining a graphics controller incorporated in the first embodiment.

After the video data 10 is decoded by the decoder 11, it is subjected to image synthesis. The to-be-displayed image data thus obtained is transferred to the video memory 13 and written to an overlay surface therein under the control of the graphics driver 12. The image data written to the overlay surface is overlaid on the graphics data written in the video memory 13, under the control of the graphics controller 14. FIG. 2 shows this state.

As seen from FIG. 2, the video memory 13 is divided into three areas—a primary surface 21, secondary surface 22 and overlay surface 23. The graphics controller 14 automatically switches the primary surface 21 and secondary surface 22 from one to the other to display graphics data.

The primary surface 21 and secondary surface 22 are used alternately. Specifically, while graphics data is read from the primary surface 21 and output to the monitor display 15, new graphics data is written to the secondary surface 22. As a result, data, which is now being written, is prevented from being displayed, thereby smoothing, for example, the movement of a window.

Video data written to the overlay surface 23 is displayed in the form of an overlay window (video reproduction window) 25 on a present reproduction screen 24. The graphics controller 14 computes the size of the overlay window 25, and combines the video data in the overlay surface 23 with the video data in the primary or secondary surface 21 or 22 so that the size of the to-be-displayed video data is adjusted to that of the overlay window 25. As a result, video data can be written to the overlay surface 23 regardless of the timing of display and the size of the overlay window.

The above-described copy protection certification by the graphics controller 14 and the reference by the controller 14 to the result of decoder certification must be made before particular image processing, such as attachment of an image to a sphere image. In other words, copy protection certification and reference to the result of decoder certification must be made concerning the data obtained before any image processing is performed thereon.

Figure 3:
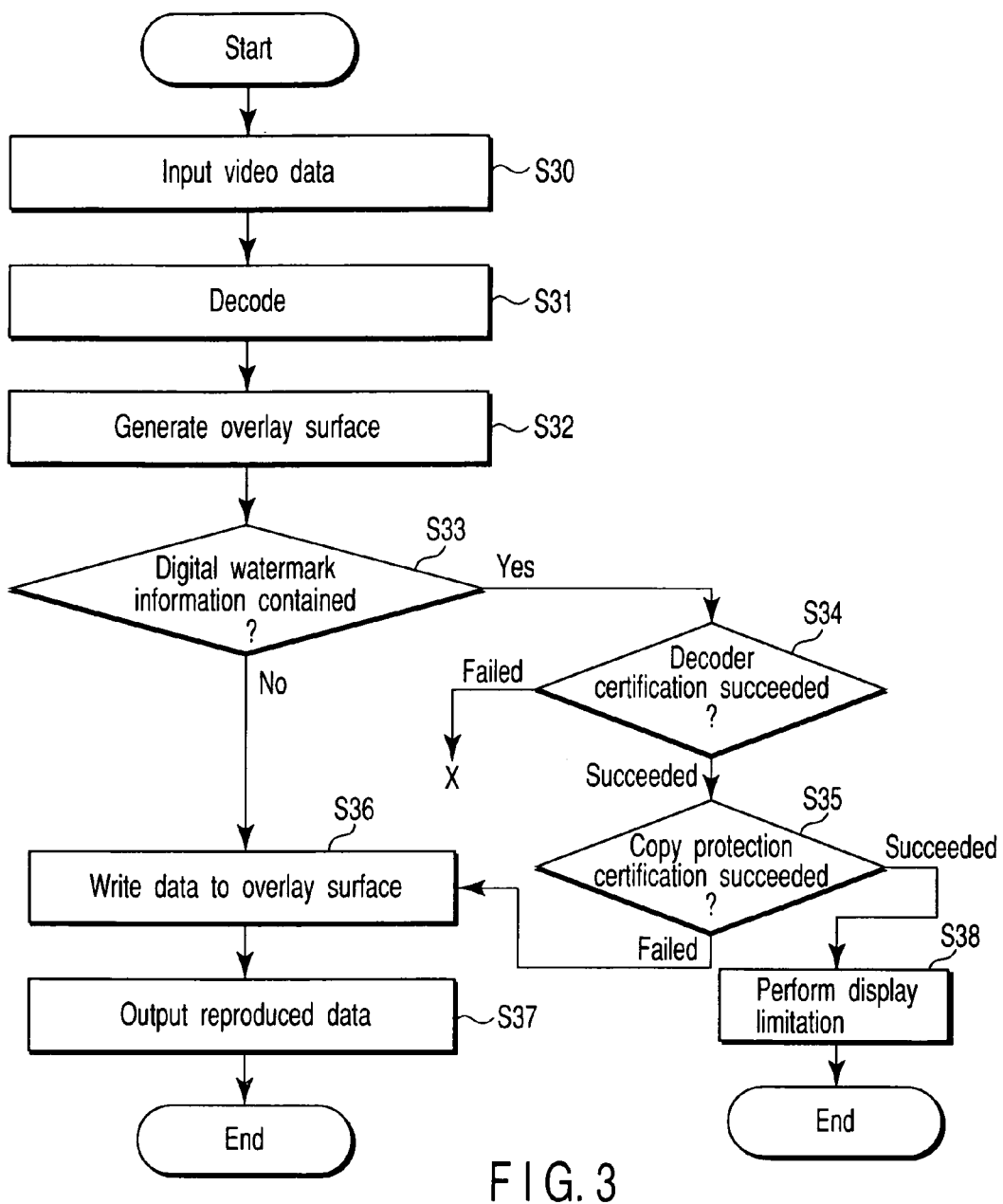
FIG. 3 is a flowchart illustrating the procedure of output control of reproduced video data in the first embodiment.

Referring to the flowchart of FIG. 3, a description will be given of the procedure of controlling the output of reproduced video data, employed in the embodiment, i.e., the procedure of decoding video data 10 and outputting the decoded data to the monitor display 15.

Firstly, video data 10 reproduced by, for example, a DVD drive (not shown) is input and decoded by the decoder 11 (steps S30 and S31). Subsequently, a video display area for storing the decoded data, for example, overlay surface, is generated in the video memory 13 (step S32). Copy protection certification as to whether or not the video data 10 is copy-prevented data, i.e., whether or not the video data 10 contains digital watermark information, is performed (step S33). If the video data 10 contains no digital watermark information, the decoded data is written to the video data display area (step S36). If, on the other hand, the video data 10 contains digital watermark information, the graphics controller 14 refers to the result of certification made by the decoder 11 concerning this data (step S34).

If the decoder certification concerning the video data has succeeded, i.e., if the video data is certified to have been reproduced by a legitimate reproduction route, copy protection certification as to whether or not the video data 10 should be protected from being copied is performed using the digital watermark information (step S35). For example, at the step S35, it is determined from the digital watermark information whether or not the video data 10 has been copied so far less than a predetermined number of times. If the copy protection certification has failed (i.e., it is determined that the video data 10 has been copied so far less than the predetermined number of times), the decoded data is written to the video data display area (step S36). On the other hand, if the copy protection certification has succeeded, the manner of writing the decoded data to the video data display area is limited (step S38). Lastly, the decoded data stored in the video data display area of the video memory 13 is output to the monitor display 15 for reproduction (step S37).

On the other hand, the video data whose decoder certification has failed, i.e., the video data reproduced by an illegitimate reproduction route, is prevented from being written to the overlay surface of the video memory 13 and output to the monitor display 15.

SECOND EMBODIMENT

Figure 4:
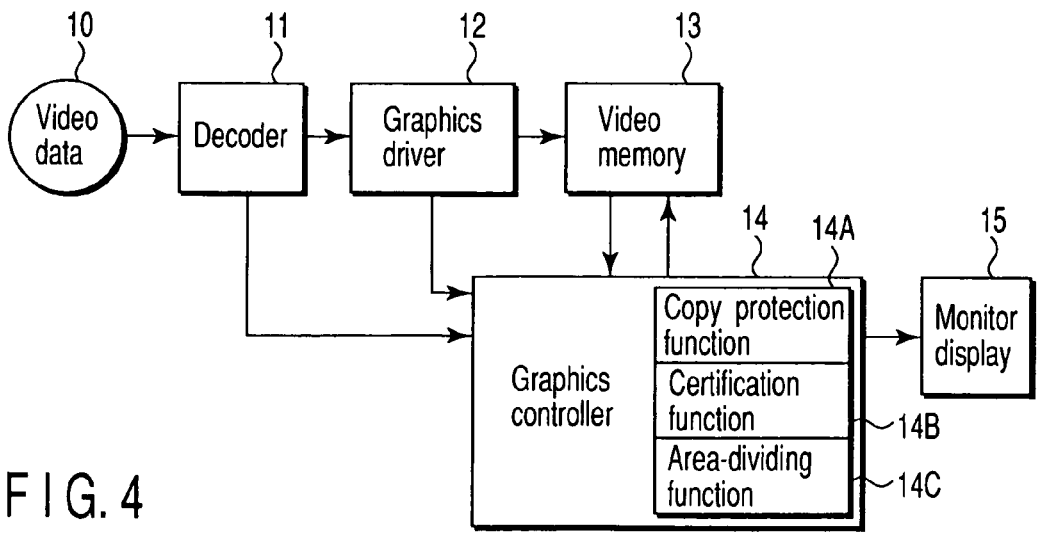
FIG. 4 is a block diagram illustrating the configuration of a computer system according to a second embodiment of the invention.

FIG. 4 is a block diagram illustrating the part of a computer system that relates to video reproduction and accords to a second embodiment of the invention. In FIG. 4, elements similar to those of FIG. 1 are denoted by corresponding reference numerals. In the second embodiment, the graphics controller 14 further comprises an area-dividing function 14C. Using the area-dividing function 14C, the graphics controller 14 divides the reproduction screen of the monitor display 15 into a plurality of areas when performing video reproduction on the display 15. After that, the controller 14 performs copy protection certification as to whether or not video data 10 in each area is copy-prevented data, i.e., whether or not the video data 10 contains digital watermark information.

If the video data 10 is copy-prevented data, the graphics controller 14 refers to the result of certification made by the decoder 11 concerning this data. Concerning the video data whose certification has succeeded, i.e., the video data certified to have been reproduced by a legitimate reproduction route, the graphics controller 14 performs copy protection processing on the data decoded by the decoder 11 and outputs the resultant data to the monitor display 15. In contrast, concerning the video data whose decoder certification has failed, i.e., the video data reproduced by an illegitimate reproduction route, the controller 14 inhibits the output of this data to the monitor display 15.

In a personal computer with the window system, if a window (overlay surface) is assigned to each application program, the process of synthesizing an image using the overlay surface is performed. Therefore, the same copy protection method as employed in the first embodiment can be utilized.

On the other hand, if video data is directly written into the video frame memory for display, the graphics controller 14 performs copy protection certification and refers to the result of decoder certification, concerning the decoded data in the display video frame memory that corresponds to the output to the monitor display 15. As a result, the decoded data corresponding to copy-prevented video data is subjected to copy protection processing, and then output to the monitor display 15. Thus, the video data is effectively protected from being copied.

In the embodiment, the reproduction screen may be divided, for example, in the following manners:

(1-1) The reproduction screen is divided into a predetermined number of equal-size columns and a predetermined number of equal-size rows. (1-2) The reproduction screen is divided such that the central area is larger than the peripheral areas.

Figure 5:
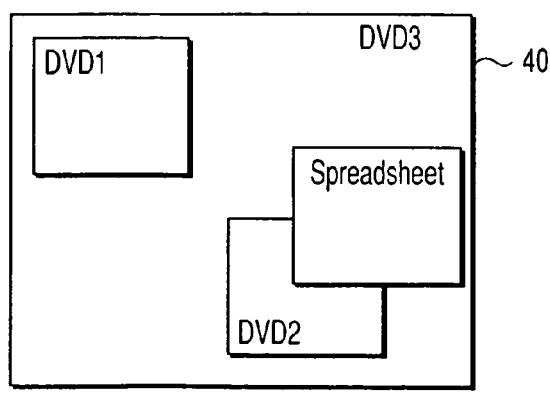
FIG. 5 illustrates a video data display form on a monitor display incorporated in the second embodiment.

In the above computer system, as shown in, for example, FIG. 5, it is possible to simultaneously reproduce DVD 1 data in a window on a reproduction screen 40, DVD 2 data in another window on the screen 40, spreadsheet data in a further window on the screen 40, and DVD 3 data directly on the screen 40. In this case, assume that the reproduction screen is divided into three equal columns and two equal rows, as in the reproduction screen 42 shown in FIG. 6, and it is necessary to protect DVD 1 data and DVD 2 data from being copied. If copy protection certification is performed as to whether or not the data in each of areas 1 to 6 is copy-prevented data, i.e., whether or not each area contains digital watermark information, copy protection information is detected from the areas 1, 3, 4 and 6, since these areas contain the DVD 1 or 2 data.

Figure 6:
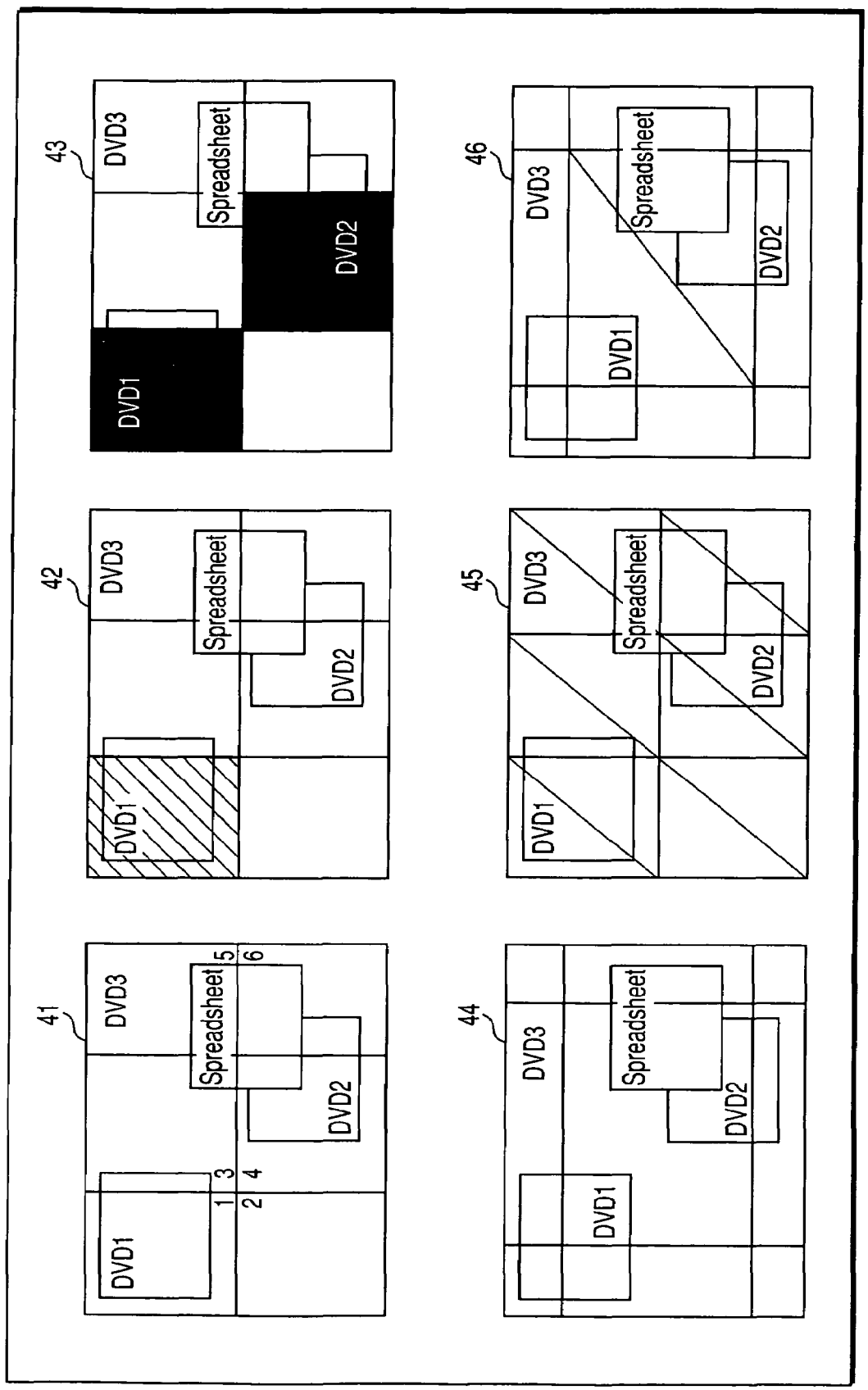
FIG. 6 is a view useful in explaining copy protection in the second embodiment.

Further, in the case of a reproduction screen 42 in FIG. 6, only the hatched area 1, which contains the largest number of copy protection information items, is protected from being copied. In the case of a reproduction screen 43 in FIG. 6, the black areas 1 and 4, signal values detected in which are higher than a predetermined threshold value set for the copy protection information, are protected from being copied.

The dividing manner of the reproduction screen of the monitor display 15 is not limited to that employed in the above reproduction screens 41 to 43, in which the screen is divided into equal-size rows and equal-size columns. Alternatively, the reproduction screen may be divided like a reproduction screen 44 in FIG. 6, in which the central area is larger than the peripheral areas. Further, the reproduction screen may be divided into triangular areas like a reproduction screen 45 in FIG. 6, or circular areas. The reproduction screen may also be divided into triangular or rectangular areas like a reproduction screen 46.

Figure 7:
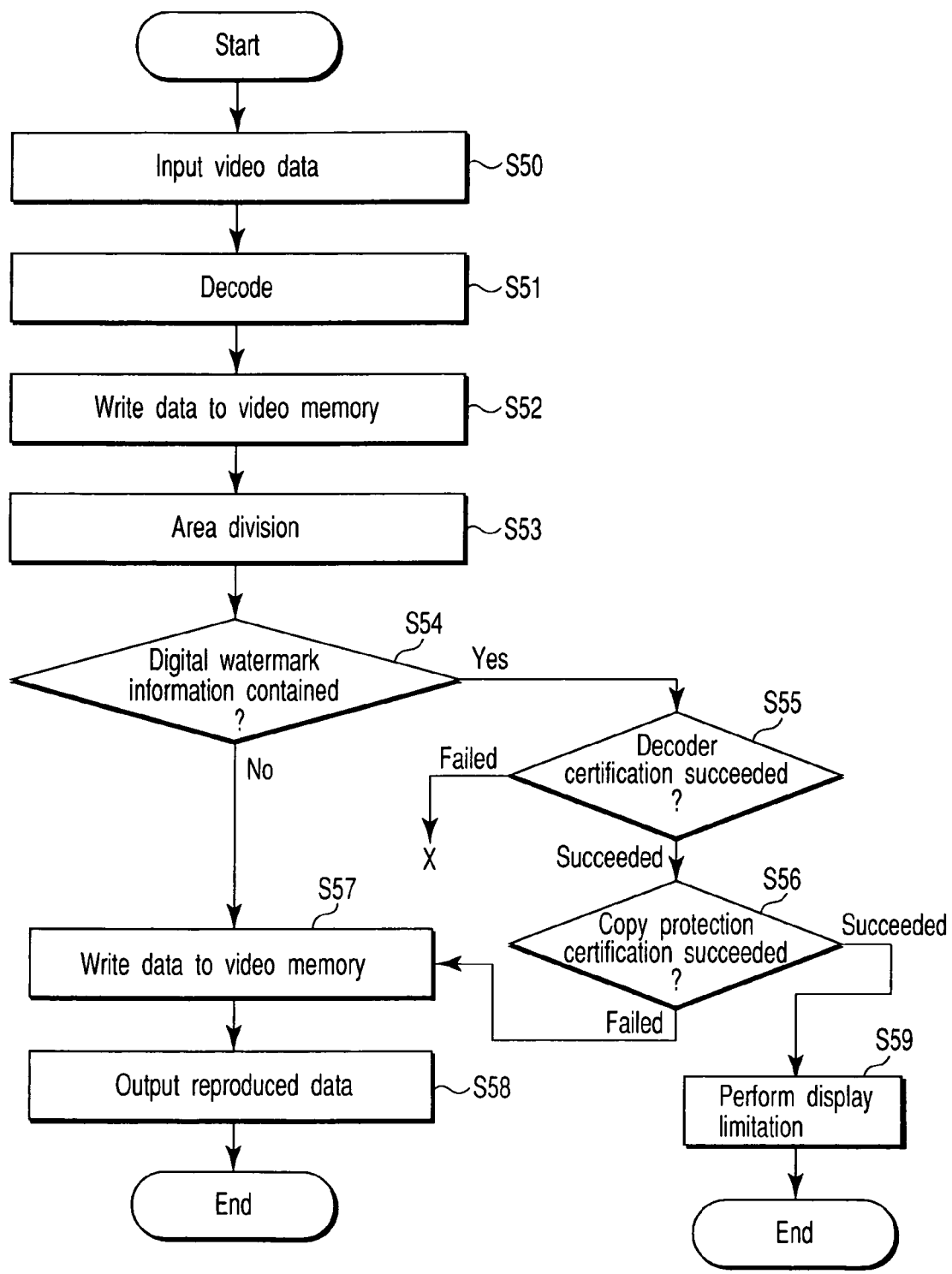
FIG. 7 is a flowchart illustrating the procedure of output control of reproduced video data in the second embodiment.

Referring then to the flowchart of FIG. 7, the procedure of controlling the output of reproduced video data will be described.

Firstly, video data 10 reproduced by, for example, a DVD drive (not shown) is input and decoded (steps S50 and S51). Subsequently, the decoded data is written into the video memory 13 (step S52). At this time, a video display area, such as the overlay surface, may be generated as in the first embodiment.

Thereafter, the reproduction screen of the monitor display 15 is divided into a plurality of areas (step S53), and performs copy protection certification for each area as to whether or not video data 10 is copy-prevented data, i.e., whether or not it contains digital watermark information (step S54). If the video data 10 contains no digital watermark information, the decoded data is written to the video data display area (step S36). If, on the other hand, the video data 10 contains digital watermark information, the graphics controller 14 refers to the result of certification made by the decoder 11 concerning the video data 10 (step S55).

Concerning the video data whose certification has succeeded, i.e., the video data certified to have been reproduced by a legitimate reproduction route, copy protection certification as to whether or not the video data 10 should be protected from being copied is performed using the digital watermark information (step S56). For example, at the step S56, it is determined from the digital watermark information whether or not the video data 10 has been copied so far less than a predetermined number of times. If the copy protection certification has failed (i.e., it is determined that the video data 10 has been copied so far less than the predetermined number of times), the decoded data is written to the video data display area (step S57). On the other hand, if the copy protection certification has succeeded, the manner of writing the decoded data to the video data display area is limited (step S59). Lastly, the decoded data stored in the video data display area of the video memory 13 is output to the monitor display 15 for reproduction (step S58).

On the other hand, the video data whose decoder certification has failed, i.e., the video data reproduced by an illegitimate reproduction route, is prevented from being written into the video memory 13 and output to the monitor display 15.

THIRD EMBODIMENT

Figure 8:
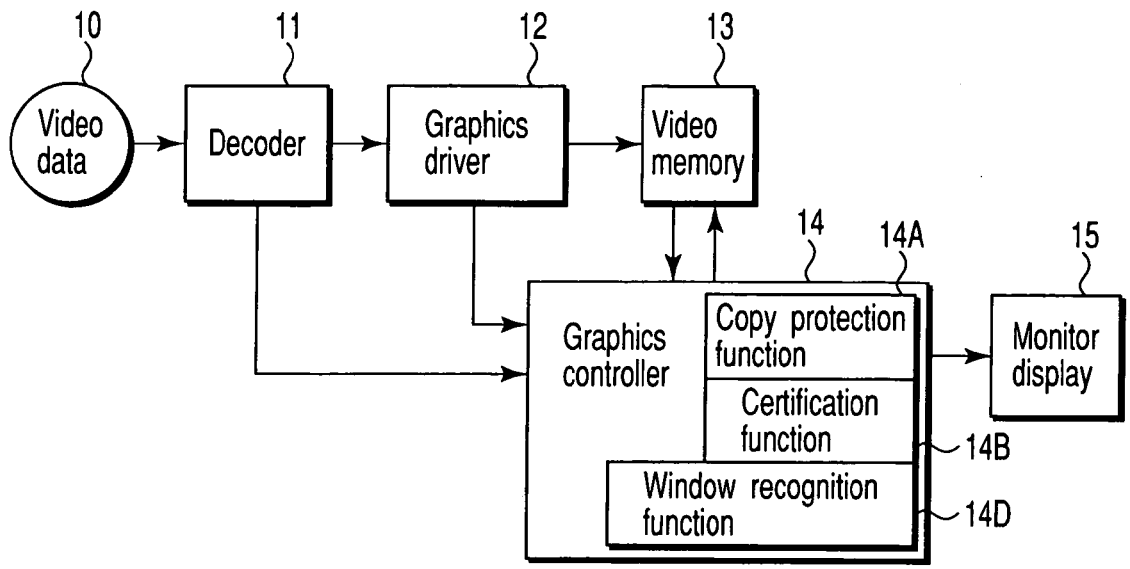
FIG. 8 is a block diagram illustrating the configuration of a computer system according to a third embodiment of the invention.

FIG. 8 is a block diagram illustrating the part of a computer system that relates to video reproduction and accords to a third embodiment of the invention. In FIG. 8, elements similar to those of FIG. 1 are denoted by corresponding reference numerals. In the third embodiment, the graphics controller 14 further comprises a window recognition function 14D. Using the window recognition function 14D, the graphics controller 14 recognizes a window or windows on the reproduction screen of the monitor display 15 before reproducing video data on the display 15, and performs copy protection certification on video data 10 in each recognized window, thereby determining whether or not the data contains digital watermark information.

If it is determined that the video data 10 contains digital watermark information, the graphics controller 14 refers to the result of certification made by the decoder 11 concerning this data. Concerning the video data whose certification has succeeded, i.e., the video data certified to have been reproduced by a legitimate reproduction route, the graphics controller 14 performs copy protection processing on decoded data and outputs the resultant data to the monitor display 15.

In contrast, concerning the video data whose certification has failed, i.e., the video data reproduced by an illegitimate reproduction route, the controller 14 inhibits the output of this data to the monitor display 15.

If video data is directly written into the display video frame memory, the graphics controller 14 performs copy protection certification and refers to the result of decoder certification, concerning the decoded data in the display video frame memory that corresponds to the output to the monitor display 15. As a result, the decoded data corresponding to video data that is copy-prevented data is subjected to copy protection processing, and then output to the monitor display 15. Thus, the video data is effectively protected from being copied.

The following methods, for example, may be used as the window recognition method in the embodiment:

(2-1) Method using edge detection
(2-2) Method using the frequency of access to the memory
(2-3) Method using a pixel value distribution Firstly, a method for recognizing a window based on edge detection using primary differential will be described. In the boundary of areas, the pixels have significantly different brightness values. Therefore, if differential is performed concerning changes in pixel value, edge detection can be performed. If standard difference computation is executed, noise components contained in video data may also be involved in the computation process. To avoid this, some filters having a function for reducing the level of noise and removing noise itself have been proposed. An example using a Sobel filter will now be described.

Figure 9:
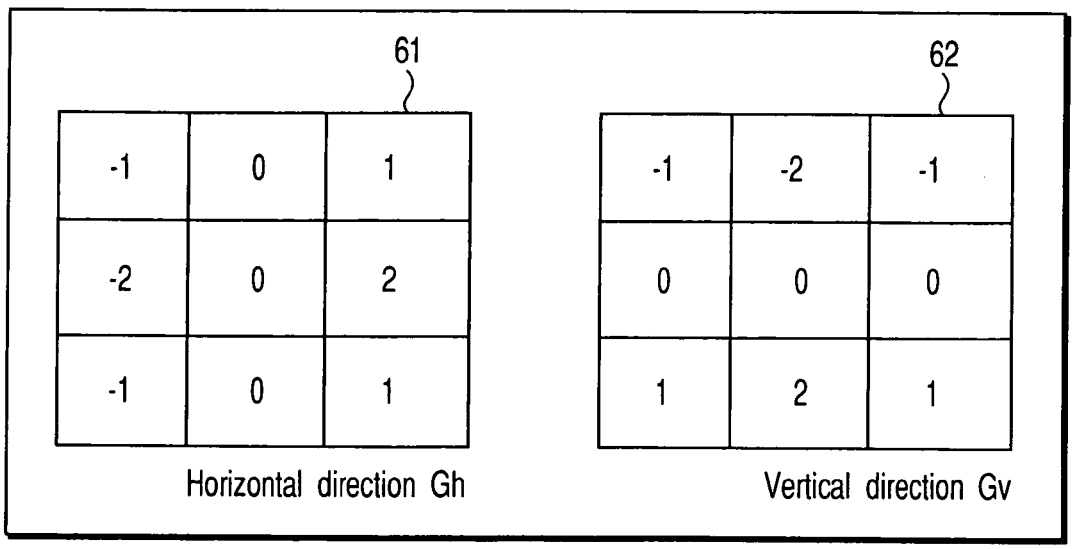
FIG. 9 is a view useful in explaining a window certification method using edge detection, employed in the third embodiment.

As is shown in FIG. 9, the Sobel filter multiplies, by respective predetermined coefficients, the values of nine pixels that include a target pixel and its peripheral eighth pixels, and sums up the multiplication results. In the example of FIG. 9, this process is performed, using a coefficient matrix 61 in the horizontal direction and a coefficient matrix 62 in the vertical direction. If the horizontal and vertical sums obtained in the process are represented by Gh and Gv, respectively, the value of the target pixel is given by $(Gh^2+Gv^2)^{1/2}$. From this, a window edge for recognizing a window is detected.

Figure 10:
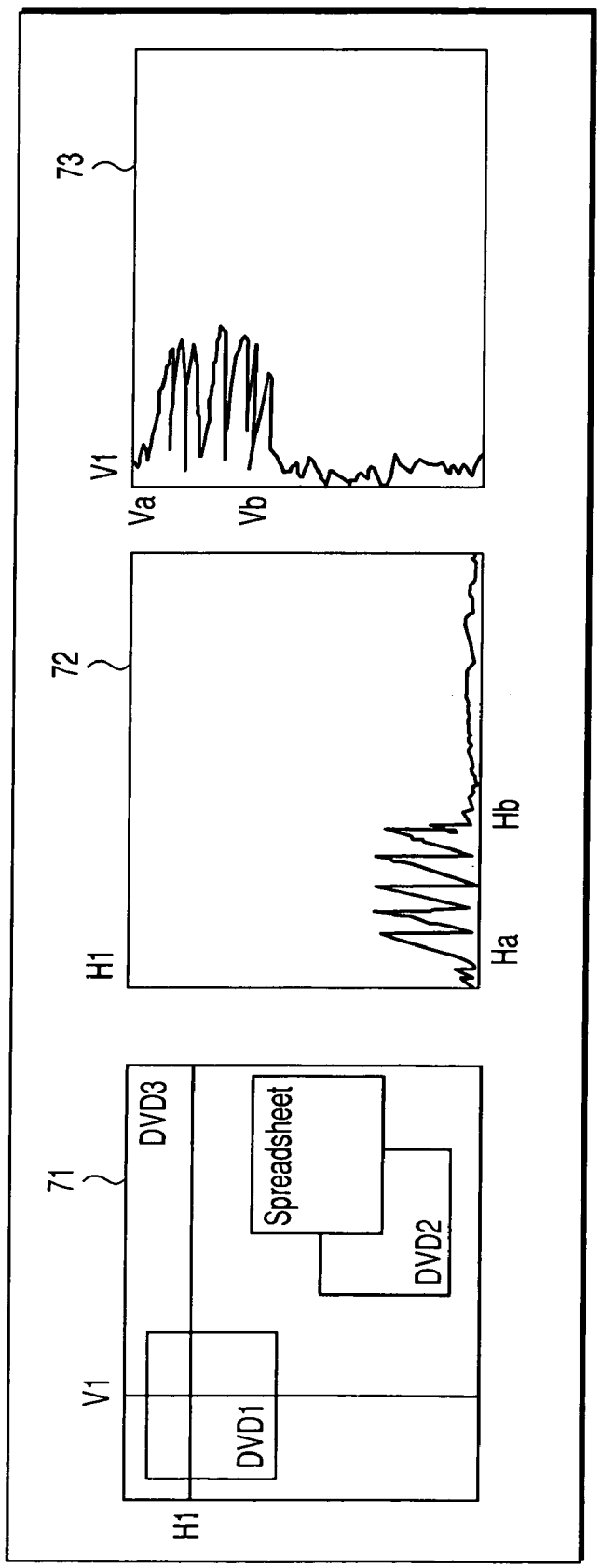
FIG. 10 is a view useful in explaining a window certification method using histograms, employed in the third embodiment.

A method for recognizing a window based on the frequency of access will be described. Assume, for example, that as shown in FIG. 10, the computer system simultaneously reproduces DVD 1 data, DVD 2 data and spreadsheet data in respective windows on a reproduction screen 71, and DVD 3 data directly on the screen 71 (i.e., the screen 71 exhibits the same state as the screen 40 in FIG. 5). In this case, the video memory 13 defines therein memory areas corresponding to the DVD 1, DVD 2 and DVD 3. During reproduction of a DVD, the frequency of access to the memory area corresponding to the DVD is considered very high. In other words, it is strongly possible that the memory area now accessed at a high frequency corresponds to the window that displays DVD data that is now being reproduced.

Further, assume that pixel value distributions 72 and 73 have been acquired in the horizontal line H1 and vertical line V1 of the reproduction screen 71 of FIG. 10, respectively. In this case, the position of a window can be determined from change points Ha and Hb in the pixel value distribution 72 and change points Va and Vb in the pixel value distribution 73. Thus, the window is recognized.

Figure 11:
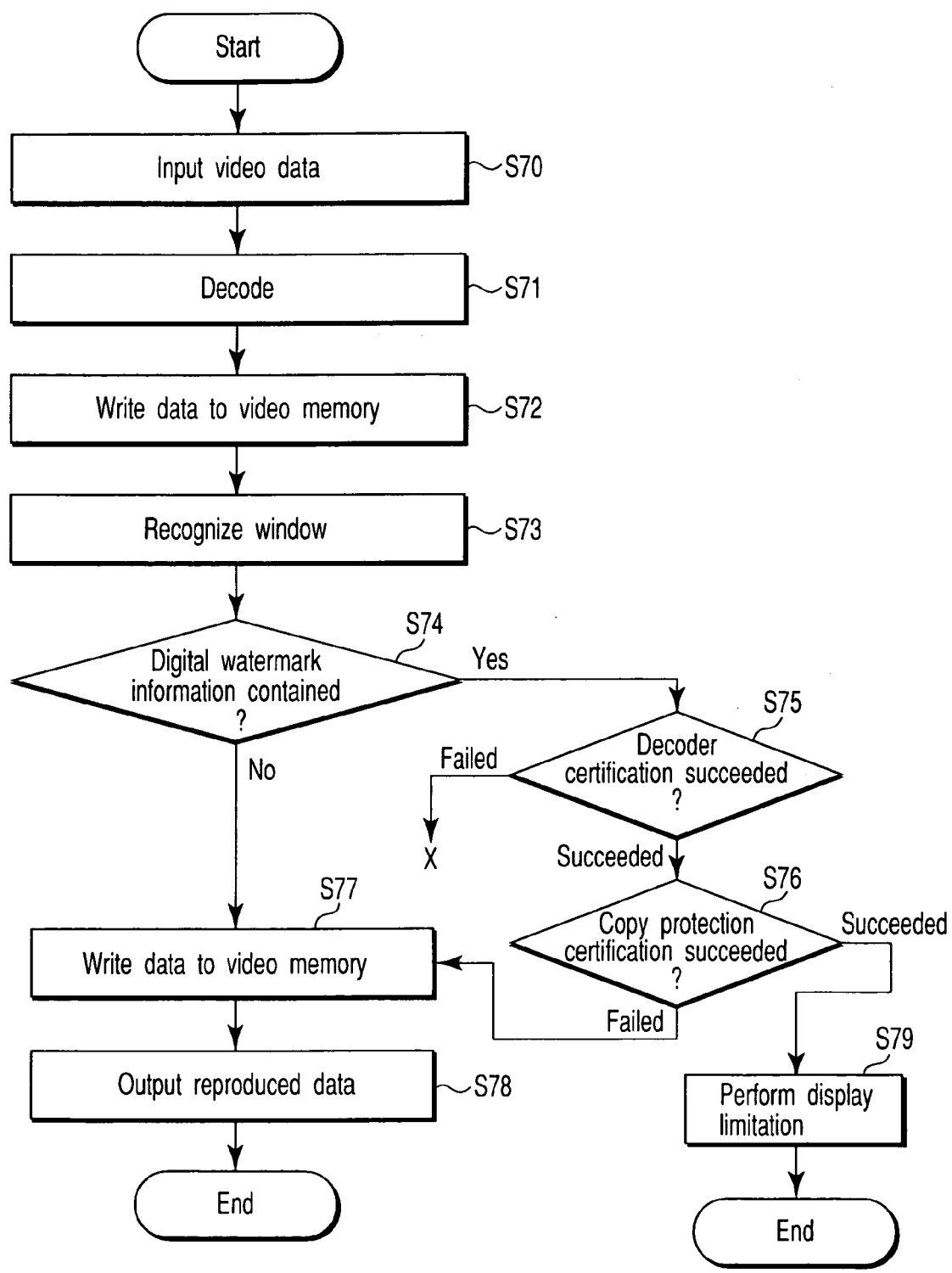
FIG. 11 is a flowchart illustrating the procedure of output control of reproduced video data in the third embodiment.

Referring to the flowchart of FIG. 11, a description will be given of the procedure of controlling the output of reproduced video data, employed in the embodiment.

Firstly, video data 10 reproduced by, for example, a DVD drive (not shown) is input and decoded (steps S70 and S71). The decoded data is written into the video memory 13 (step S72), After that, window recognition is performed on the reproduction screen of the monitor display 15 (step S73), and copy protection certification as to whether the video data 10 is copy-prevented data, i.e., whether or not the data contains digital watermark information, is performed (step S74). If it is determined at the step S74 that the video data 10 contains digital watermark information, the graphics controller 14 refers to the result of certification made by the decoder 11 concerning this data (step S75).

Concerning the video data whose certification has succeeded, i.e., the video data certified to have been reproduced by a legitimate reproduction route, copy protection certification as to whether or not the video data 10 should be protected from being copied is performed using the digital watermark information (step S76). For example, at the step S76, it is determined from the digital watermark information whether or not the video data 10 has been copied so far less than a predetermined number of times. If the copy protection certification has failed (i.e., it is determined that the video data 10 has been copied so far less than the predetermined number of times), the decoded data is written to the video data display area (step S77). On the other hand, if the copy protection certification has succeeded, the manner of writing the decoded data to the video data display area is limited (step S79). Lastly, the decoded data stored in the video data display area of the video memory 13 is output to the monitor display 15 for reproduction (step S78).

On the other hand, concerning the video data whose decoder certification has failed, i.e., the video data reproduced by an illegitimate reproduction route, the graphics controller 14 does not write the data decoded by the decoder 11 into the video memory 13, thereby preventing the data from being output to the monitor display 15.

FOURTH EMBODIMENT

Figure 12:
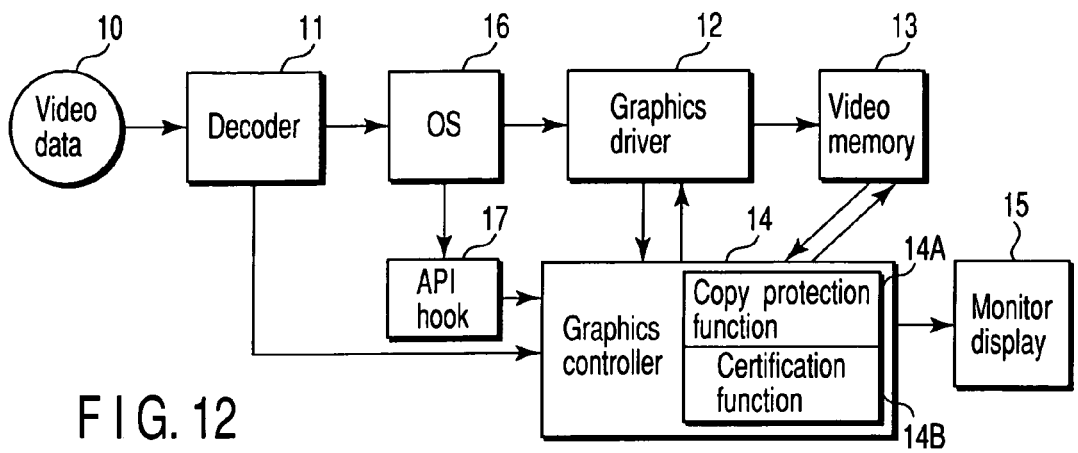
FIG. 12 is a block diagram illustrating the configuration of a computer system according to a fourth embodiment of the invention.

FIG. 12 is a block diagram illustrating the part of a computer system that relates to video reproduction and accords to a fourth embodiment of the invention. An operating system (OS) 16 and API hook unit 17 are shown.

In the fourth embodiment, when the OS 16 executes an imaging instruction API (Application Programming Interface), the API hook unit 17 hooks an imaging instruction API call. The graphics controller 14 performs copy protection certification as to whether or not video data 10, which is to be output using the hooked API call, contains digital watermark information.

If the video data 10 is copy-prevented data, the graphics controller 14 refers to the result of certification made by the decoder 11 concerning this data. Concerning the video data certified to have been reproduced by a legitimate reproduction route, the graphics controller 14 performs copy protection processing on the data decoded by the decoder 11, and outputs the resultant data to the monitor display 15.

On the other hand, concerning the video data reproduced by an illegitimate reproduction route, the graphics controller 14 prevents the decoded data from being output to the monitor display 15.

A detailed description will be given of the operations related to the imaging instruction API call.

When the OS 16 executes an imaging instruction API, the API hook unit 17 hooks an imaging instruction API call, transfers control to the copy protection function 14A of the graphics controller 14, and generates an API call after copy protection information is detected. More specifically, when an application has issued an imaging instruction, a certain imaging routine is called and an interruption occurs, therefore a pointer in a jump table corresponding to the interruption is fetched.

The type of interruption can be determined by reading the contents of the memory indicated by the pointer. If it is determined that the interruption relates to an imaging routine, the graphics controller 14 performs copy protection certification as to whether or not video data 10 is copy-prevented data, i.e., whether or not the data contains digital watermark information.

If the video data 10 is copy-prevented data, the graphics controller 14 refers to the result of certification made by the decoder 11 concerning this data. If it is determined from the decoder certification that the video data 10 has been reproduced by a legitimate reproduction route, the graphics controller 14 causes an API call to be generated, then performs copy protection processing on the decoded data and outputs the resultant data to the monitor display 15.

On the other hand, if it is determined that the video data has been reproduced by an illegitimate reproduction route, the graphics controller 14 prevents the generation of an API call to thereby prevent the decoded data from being output to the monitor display 15.

The copy protection method employed in the first to third embodiments expects no supports from the OS 16, while the copy protection method employed in the fourth embodiment expects supports from the OS 16. When video data is reproduced, an imaging instruction API for flushing the screen and an imaging instruction API for window operation, etc. are utilized. When such an imaging instruction API is transferred to the graphics driver 12, the graphics controller 14 performs copy protection certification and refers to the result of decoder certification, thereby performing copy protection processing on the copy-prevented data and outputting the resultant data to the monitor display 15. Thus, copy protection can be performed effectively.

Figure 13:
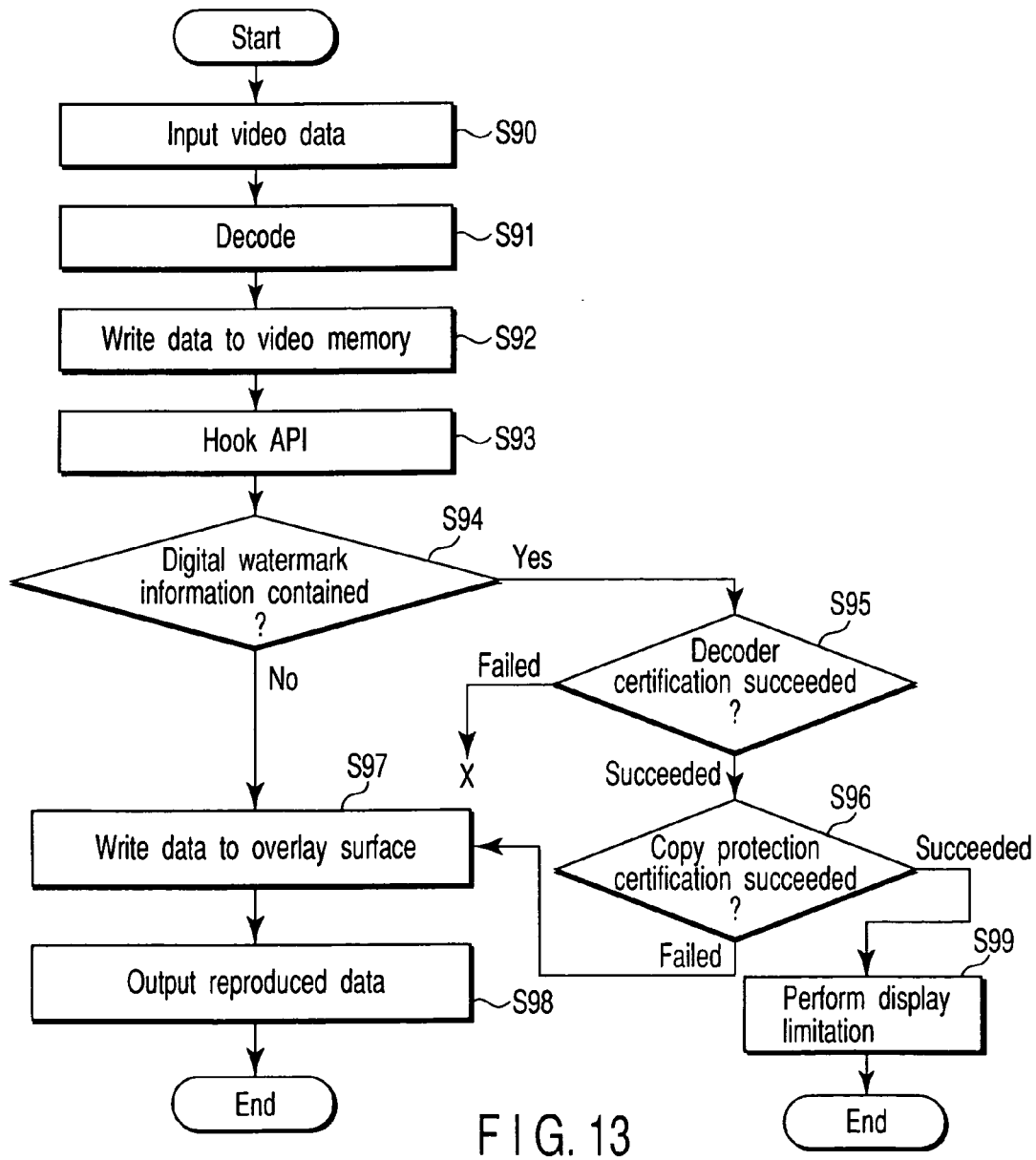
FIG. 13 is a flowchart illustrating the procedure of output control of reproduced video data in the fourth embodiment.

Referring now to the flowchart of FIG. 13, a description will be given of the procedure of controlling the output of reproduced video data, employed in the embodiment.

Firstly, video data 10 reproduced by, for example, a DVD drive (not shown) is input and decoded by the decoder 11 (steps S90 and S91). Subsequently, the decoded data is written into the video memory 13 (step S92).

After that, the OS 16 hooks an imaging instruction API to be transferred to the graphics driver 12 (step S93), thereby performing copy protection certification as to whether or not the video data 10 is copy-prevented data, i.e., whether or not the video data 10 contains digital watermark information (step S94). If the video data 10 contains no digital watermark information, the decoded data is written to the video data display area (step S97). If, on the other hand, the video data 10 contains digital watermark information, the graphics controller 14 refers to the result of certification made by the decoder 11 concerning this data (step S95).

If the certification of the video data has succeeded, the graphics controller 14 determines that the video data has been reproduced by a legitimate reproduction route, copy protection certification as to whether or not the video data 10 should be protected from being copied is performed using the digital watermark information (step S96). For example, at the step S96, it is determined from the digital watermark information whether or not the video data 10 has been copied so far less than a predetermined number of times. If the copy protection certification has failed (i.e., it is determined that the video data 10 has been copied so far less than the predetermined number of times), the decoded data is written to the video data display area (step S97). On the other hand, if the copy protection certification has succeeded, the manner of writing the decoded data to the video data display area is limited (step S99). Lastly, the decoded data stored in the video data display area of the video memory 13 is output to the monitor display 15 for reproduction (step S98).

On the other hand, the video data whose decoder certification has failed, i.e., the video data reproduced by an illegitimate reproduction route, is prevented from being written into the video memory 13 and output to the monitor display 15.

(Copy Protection)

The following methods, for example, may be used as the copy protection method in the first to fourth embodiments:

(3-1) The level of the brightness or color difference component of the target portion is changed.

(3-2) The target portion is hatched by a noise line, such as a red line.

(3-3) The target portion is hatched by thin noise lines.

(3-4) The target portion is solidly shaded with a single color.

(3-5) The target portion is covered with a mosaic pattern.

(3-6) The brightness or color difference component of the target portion is reversed.

Assume, for example, that in the example of FIG. 5 where DVD 1 data, DVD 2 data and spreadsheet data are reproduced in respective windows displayed on the reproduction screen 40 of the monitor display 15, and DVD 3 data is reproduced directly on the screen 40, the reproduction screen is divided, by the area-dividing method employed in the second embodiment, into two rows and three columns like the reproduction screen 41 in FIG. 6.

In FIG. 6, the reproduction screen 42 is an example where data in the area 1 should be protected from being copied, and is copy-prevented by hatching. Similarly, the reproduction screen 43 is an example where data in the areas 1 and 4 should be protected from being copied, and is copy-prevented by solidly shading them.

Where a plurality of copy protection manners are employed on a single reproduction screen (for example, in FIG. 5, DVD 1 data should not be copied, DVD 2 data may be copied a predetermined number of times or less, and DVD 3 data may be copied), the following methods, for example, may be used:

(4-1) Method for protecting data in areas in accordance with respective conditions for the areas;

(4-2) Method for performing copy protection based on the data to be protected in the most reliable manner;

(4-3) Method for protecting the entire monitor display;

(4-4) Method for protecting only a data-reproducing area with high priority; and (4-5) Method for protecting Macrovision and CGMS-A data in accordance with the data to be protected in the most reliable manner Assume, for example, that in the example of FIG. 5 where DVD 1 data, DVD 2 data and spreadsheet data are reproduced in respective windows displayed on the reproduction screen 40 of the monitor display 15, and DVD 3 data is reproduced directly on the screen 40, the reproduction screen is divided, by the area-dividing method employed in the second embodiment, into two rows and three columns like the reproduction screen 41 in FIG. 6.

In FIG. 6, the reproduction screen 42 is an example where data in the area 1 should be protected from being copied, and is copy-prevented by hatching. In this case, data in each area is protected in accordance with the condition for each area. Similarly, the reproduction screen 43 is an example where data in the areas 1 and 4 should be protected from being copied. In this case, it is requested that data in the area 1 be copy-prevented by hatching, and data in the area 4 be copy-prevented based on the Macrovision and CGMS-A schemes. Therefore, data in the areas 1 and 4 is copy-prevented in the most limited display manner (i.e., by solid black shading).

(Copy Protection Certification and Decoder Certification)

Assume here that copy protection information has been illegally altered using software. In each of the above-described embodiments, two-stage certification, i.e., copy protection certification by the graphics controller 14 and decoder certification by the decoder 11, is performed. In this structure, even if an error occurs in copy protection certification because of illegal alteration of copy protection information, illegal copying is prevented by decoder certification by the decoder 11.

Figure 14:
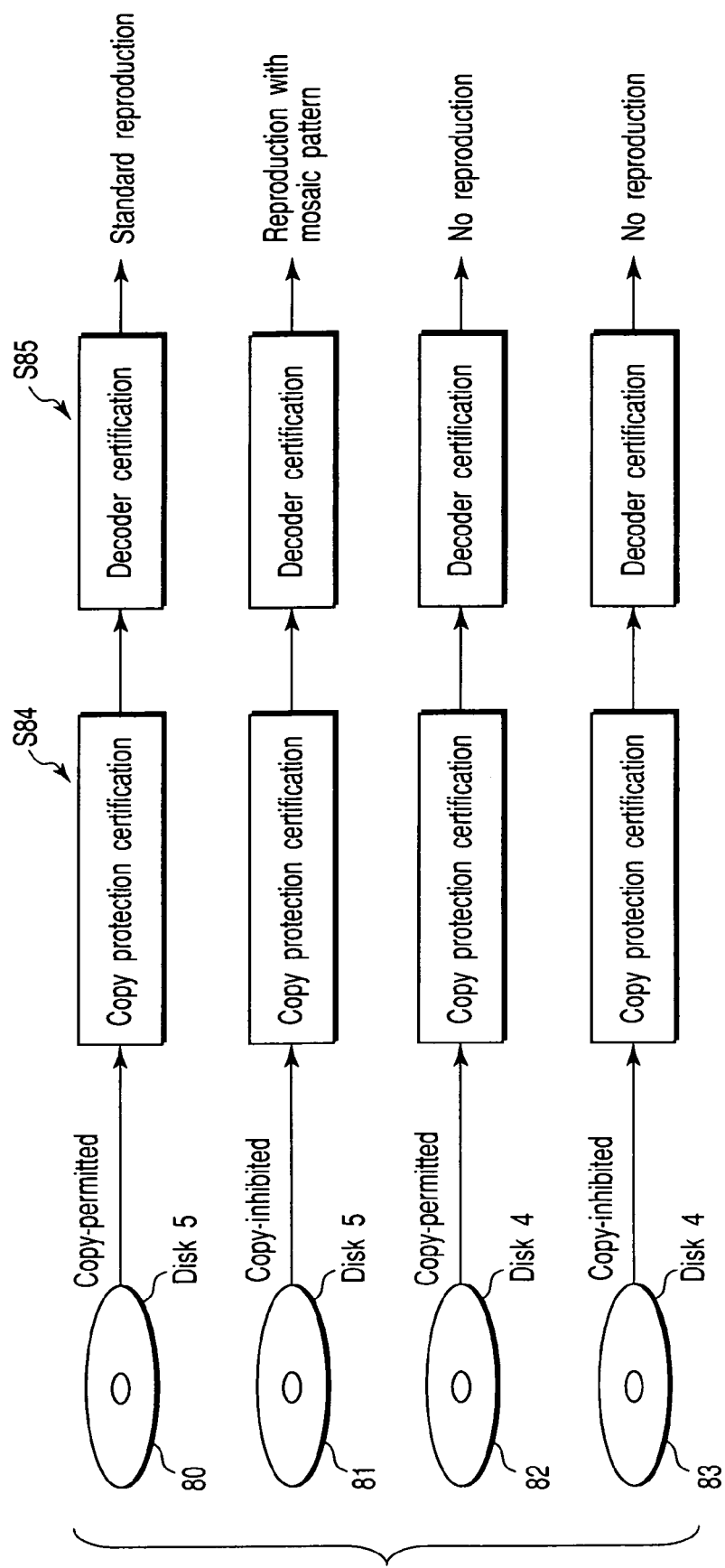
FIG. 14 is a view useful in explaining the concept of copy protection employed in the fourth embodiment.

Assume, for example, that video data 80 to 83 recorded on a rewritable disk, such as a DVD-RAM, is reproduced and output to the monitor display 15 as shown in FIG. 14. Further, assume that the decoder 11 performs certification of disks from which the video data is reproduced, and only a disk of number 5 is a legitimate one. In other words, assume that the decoder 11 determines that only the video data reproduced from the disk of number 5 is the one reproduced through a legitimate reproduction route.

The process shown in FIG. 14 comprises the step of inputting the video data 80 to 83 reproduced from the disks, a copy protection certification step S84 by the graphics controller 14, and a disk certification step S85 by the decoder 11. Specifically, disk certification is performed in the following manner. For example, the decoder 11 reads a serial number recorded on a disk, inquires at a certification system via the Internet whether or not the read serial number is a legitimate one, and certifies that the disk is legitimate if the certification system certifies so.

When video data 80 is input, copy protection certification as to whether or not the data is copy-limited data is performed using digital watermark information detected from the data (step S84). The copy protection information contained in copy-limited video data includes data for managing the number of copy-permitted occasions (including zero). From the certification, the video data 80 is detected to be copy-limited data (in this case, the number of copy-permitted occasions is not zero). Subsequently, the decoder 11 performs disk certification (step S85). In this case, since the number of the disk from which the video data 80 is reproduced is "5", the decoder 11 determines that disk certification has succeeded, whereby the data decoded by the decoder 11 is directly output to and reproduced on the monitor display 15.

Further, when video data 81 is input, copy protection certification as to whether or not the data is copy-prevented data is performed at the step S84 using digital watermark information detected from the data. From the certification, the video data 81 is detected to be copy-prevented data (in this case, the number of copy-permitted occasions is zero). Subsequently, the decoder 11 performs disk certification (step S85). In this case, since the number of the disk from which the video data 81 is reproduced is "5", the decoder 11 determines that disk certification has succeeded. Therefore, the data decoded by the decoder 11 is subjected to copy protection (at the time, the data is covered with a mosaic pattern), and then output to and reproduced on the monitor display 15.

When video data 82 is input, copy protection certification as to whether or not the data is copy-limited data is performed using digital watermark information detected from the data (step S84). From the certification, the video data 82 is detected to be copy-limited data (in this case, the number of copy-permitted occasions is not zero). Subsequently, the decoder 11 performs disk certification (step S85). In this case, since the number of the disk from which the video data 82 is reproduced is "4", the decoder 11 determines that disk certification has failed, whereby the data decoded by the decoder 11 is not output to the monitor display 15, i.e., is not reproduced. It can be assumed that the video data 82 is illegally altered from "copy prevention" to "copy permission" by certain software.

When video data 83 is input, copy protection certification as to whether or not the data is copy-prevented data is performed at the step S84 using digital watermark information detected from the data. From the certification, the video data 83 is detected to be copy-prevented data (in this case, the number of copy-permitted occasions is zero). Subsequently, the decoder 11 performs disk certification (step S85). In this case, since the number of the disk from which the video data 83 is reproduced is "4", the decoder 11 determines that disk certification has failed. Therefore, the data decoded by the decoder 11 is not output to the monitor display 15, i.e., is not reproduced.

Fifth to eighth embodiments obtained by modifying the first to fourth embodiments will now be described. In the fifth to eighth embodiments, the points that differ from the first to fourth embodiments will be mainly explained.

FIFTH EMBODIMENT

FIG. 15 is a block diagram illustrating the part of a computer system that relates to video reproduction and accords to a fifth embodiment of the invention. This computer system has a basic structure similar to that of the computer system of FIG. 1, and differs therefrom only in that in the former, the graphics controller 14 further comprises a copy protection certification function 14E, display limiting function 14F and display area data holding unit 14G.

In the fifth embodiment, the graphics controller 14 detects whether or not video data 10 contains digital watermark information. If the data does not contain digital watermark information, the controller 14 outputs decoded data to the monitor display 15. If, on the other hand, the data contains digital watermark information, the controller 14 performs, when an overlay surface is generated in the video memory 13, copy protection certification as to whether or not video data 10 should be protected from being copied, using the digital watermark information detected from the video data 10.

If the graphics controller 14 determines from the copy protection certification that the video data 10 should be protected from being copied, it refers to the result of certification made by the decoder 11. If the decoder certification has succeeded and the copy protection certification has failed, the graphics controller 14 writes the data decoded by the decoder 11 to the overlay surface of the video memory 13, and outputs it to the monitor display 15. On the other hand, if the decoder certification has failed, the graphics controller 14 prevents the decoded data from being written to the overlay surface, thereby preventing the output of the decoded data to the monitor display 15.

When the computer reproduces video data with a window assigned to each application program, it performs the process of synthesizing an image using an overlay surface. In this case, the graphics controller 14 performs copy protection certification and refers to the result of decoder certification. If the copy protection certification concerning video data has succeeded or the decoder certification concerning video data has failed, the controller 14 limits the manner of displaying the video data on the monitor display 15 (this will be also referred to as "display limitation"). Thus, copy protection can be made effectively. Since the operation of the graphics controller 14 is substantially the same as that of the corresponding controller in the first embodiment, no detailed description is given thereof.

Figure 16:
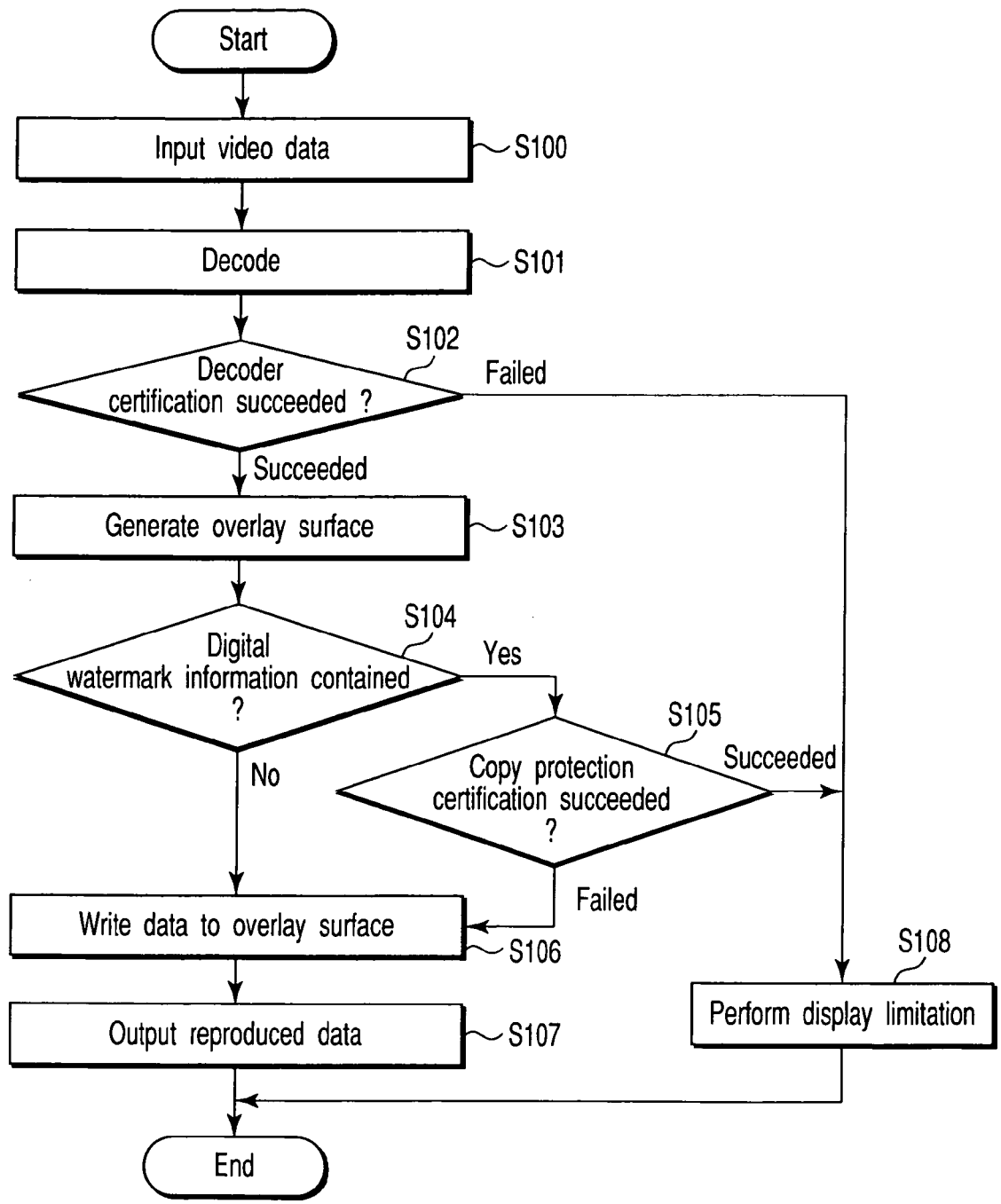
FIG. 16 is a flowchart illustrating the procedure of output control of reproduced video data in the fifth embodiment.

Referring to the flowchart of FIG. 16, a description will be given of the procedure of controlling the output of reproduced video data, according to the embodiment, i.e., the process of decoding video data 10 and outputting the decoded data to the monitor display 15.

Firstly, video data 10 reproduced by, for example, a DVD drive (not shown) is input and decoded by the decoder 11 (steps S100 and S101). Subsequently, the decoder 11 performs decoder certification as to whether or not the video data 10 has been reproduced by a legitimate reproduction route (step S102). If the decoder certification has failed, i.e., if the video data 10 has been reproduced by an illegitimate reproduction route, the manner of displaying the decoded data on the monitor display 15 is limited (step S108).

If the decoder certification has failed, i.e., if the video data 10 has been reproduced by a legitimate reproduction route, a video data display area for storing the decoded data, such as an overlay surface, is generated in the video memory 13, thereby detecting whether or not the video data 10 contains digital watermark information (steps S103 and S104).

If the video data 10 contains no digital watermark information, the decoded data is written to the video data display area (step S106). If, on the other hand, the video data 10 contains digital watermark information, copy protection certification as to whether or not the video data 10 should be protected from being copied is performed using the digital watermark information (step S105). For example, at the step S105, it is determined from the digital watermark information whether or not the video data 10 has been copied so far less than a predetermined number of times. If the copy protection certification has failed (i.e., it is determined that the video data 10 has been copied so far less than the predetermined number of times), the decoded data is written to the video data display area (step S106). On the other hand, if the copy protection certification has succeeded, the manner of writing the decoded data to the video data display area is limited (step S108). Lastly, the decoded data stored in the video data display area of the video memory 13 is output to the monitor display 15 for reproduction (step S107).

If, on the reproduction screen of the monitor display 15, the display of video data whose decoder certification has succeeded and copy protection certification has failed is superimposed upon that of video data whose decoder certification has failed or copy protection certification has succeeded, the manner of writing data to the overlay surface is limited. Thus, the manner of displaying decoded data on the monitor display 15 is limited. A description will be given of specific methods for limiting the manner of displaying data on the monitor display 15, with reference to the reproduction screens 91, 92 and 93 shown in FIGS. 17A, 17B and 17C.

Figures 17A, 17B, 17C:
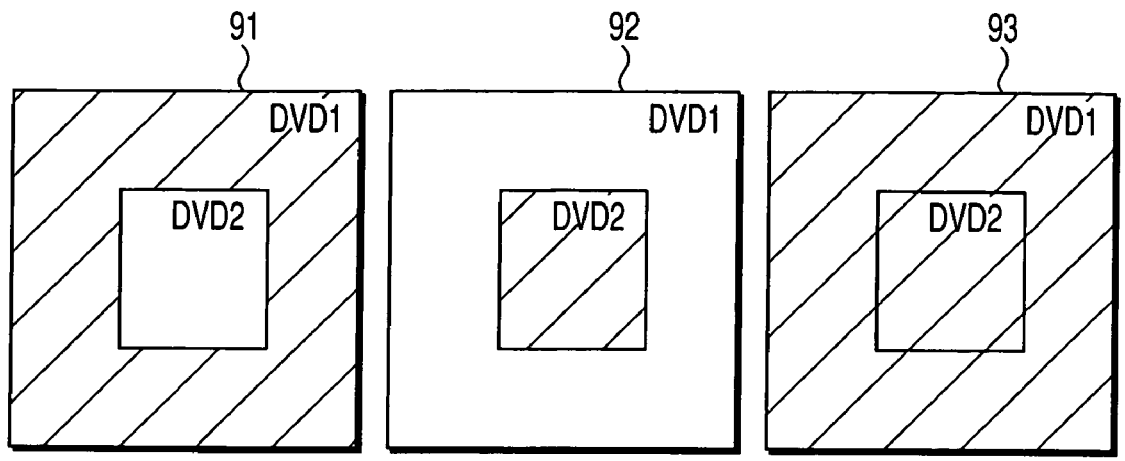
FIGS. 17A, 17B and 17C are views useful in explaining display limitation in the fifth embodiment.

In the reproduction screen 91 of FIG. 17A, assume that decoder certification has failed or copy protection certification concerning DVD 1 data has succeeded, and decoder certification has succeeded and copy protection certification concerning DVD 2 data has failed (i.e., the DVD 2 data has been reproduced by a legitimate route). In this case, it is necessary to limit the display manner of the DVD 1 data. Therefore, the area for the DVD 1 data in the overlay surface (except for the area for the DVD 2 data) is masked as indicated by hatching in FIG. 17A.

In contrast, in the reproduction screen 92 of FIG. 17B, assume that decoder certification concerning DVD 2 data has failed or copy protection certification concerning DVD 2 data has succeeded, and decoder certification concerning DVD 1 data has succeeded and copy protection certification concerning DVD 1 data has failed (i.e., the DVD 1 data has been reproduced by a legitimate route). In this case, it is necessary to limit the display manner of the DVD 2 data. Therefore, only the area for the DVD 2 data in the overlay surface is masked as indicated by hatching in FIG. 17B.

Further, in reproduction screen 93 of FIG. 17C, assume that decoder certification concerning DVD 1 data has failed or copy protection certification concerning DVD 1 data has succeeded, and decoder certification concerning DVD 2 data has succeeded and copy protection certification concerning DVD 2 data has failed (i.e., the DVD 2 data has been reproduced by a legitimate route). In this case, to limit the display manner of the DVD 1 data, the area for the DVD 1 data (including the area for the DVD 2 data) is masked as indicated by hatching in FIG. 17C.

The method for limiting the manner of displaying data on the area in which the area for data whose decoder certification concerning DVD 1 data has failed or copy protection certification concerning DVD 1 data has succeeded is superimposed upon the area for data whose decoder certification concerning DVD 2 data has succeeded and copy protection certification concerning DVD 2 data has failed may differ from that for limiting the manner of displaying data on the area in which no such superimposition exists.

The limitation or inhibition of the writing of decoded data may be realized by changing a value on the overlay surface. For example, in the reproduction screen 92 of FIG. 17B, to limit the display manner of the DVD 2 data whose decoder certification has failed and copy protection certification has succeeded the area of the overlay surface corresponding to the DVD 2 data may be masked as indicated by hatching in FIG. 17B.

When the display area for video data whose decoder certification has succeeded and copy protection certification has failed is changed on the reproduction screen of the monitor display 15, the changed display area can be subjected to copy protection if the contents of change is reported to the graphics controller 14. The display area change is, for example, a change in position or size, clipping, etc.

Specifically, when writing video data 10 into the video memory 13 in the system of FIG. 15, the graphics controller 14 holds, in the display area data holding unit 14G, information as to the video data writing position in the video memory 13. When the display area for decoded data has been changed on the monitor display 15, the contents of the display area data holding unit 14G is updated, and the graphics controller 14 performs copy protection based on the updated display area information.

Although in the embodiment, a description has been given of copy protection certification performed in the overlay surface, copy protection certification may be performed in other display areas as stated below.

Figure 18:
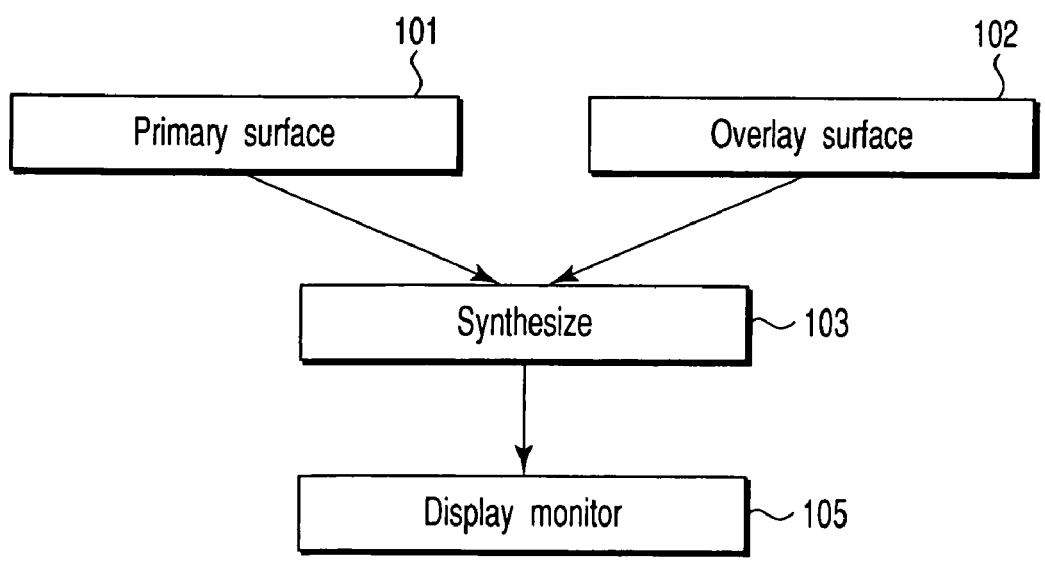
FIG. 18 is a view useful in explaining copy protection certification employed in the fifth embodiment.

(5-1) Copy protection certification in overlay surface
(5-2) Copy protection certification in primary surface
(5-3) Copy protection certification in overlay surface and that in primary surface
(5-4) Copy protection certification in overlay surface and that in primary surface, and copy protection certification in a video display area formed of overlay surface and primary surface FIG. 18 is a view useful in explaining copy protection certification performed in a display area and the output of data to the monitor display 15. As shown, copy protection certification may be performed in various areas, such as a primary surface 101, overlay surface 102 or a synthesis section 103 of the primary and overlay surfaces 101 and 102.

SIXTH EMBODIMENT

FIG. 19 is a block diagram illustrating the part of a computer system that relates to video reproduction and accords to a sixth embodiment of the invention. In FIG. 19, elements similar to those of FIG. 1 are denoted by corresponding reference numerals. In the sixth embodiment, the graphics controller 14 comprises an area-dividing function 14C, as well as the copy protection certification function 14E and display limiting function 14F. Using the area-dividing function 14C, the graphics controller 14 divides the reproduction screen of the monitor display 15 into a plurality of areas when performing video reproduction on the display 15. After that, the controller 14 performs copy protection certification as to whether or not video data 10 in each area should be protected from being copied, using digital watermark information detected from the video data 10.

In a personal computer with the window system, if a window (overlay surface) is assigned to each application program, the process of synthesizing an image using the overlay surface is performed. Therefore, the same copy protection method as employed in the first embodiment can be utilized.

On the other hand, if video data is directly written into the video frame memory for display, copy protection certification and decoder certification are performed on the decoded data in the display video frame memory that corresponds to the output to the monitor display 15. The decoded data corresponding to video data whose decoder certification has failed or copy protection certification has succeeded is output to the monitor display 15 with the manner of display limited. Thus, the decoded data is effectively protected from being copied.

In the sixth embodiment, the reproduction screen may be divided in the following manners, as in the second embodiment:

(1-1) The reproduction screen is divided into a predetermined number of equal-size columns and a predetermined number of equal-size rows.

(1-2) The reproduction screen is divided such that the central area is larger than the peripheral areas.

In addition to the above, (1-3) the division method and area may be changed with lapse of time.

In the sixth embodiment, it is possible, like the second embodiment, to simultaneously reproduce DVD 1 data, DVD 2 data and spreadsheet data in respective windows on the screen 40, and DVD 3 data directly on the screen 40, as shown in FIG. 5.

In this case, a reproduction screen 41 is divided into three equal columns and two equal rows as shown in FIG. 6, and assume that DVD 1 data has been reproduced by an illegitimate route, copy protection certification concerning DVD 1 and DVD 2 data has succeeded, and copy protection certification concerning DVD 3 data has failed. Firstly, it is determined whether or not data in each area 1 to 6 contains digital watermark information. As a result, it is determined that data in the areas 1 and 4 contains digital watermark information. After that, copy protection certification is performed on the data in the areas 1 and 4, and it is determined that only the certification in the area 1 has succeeded, therefore the display manner of the data in the area 1 is limited. The reproduction screen 42 of FIG. 6 is the case where the display manner of data is limited in the area 1 as indicated by hatching. Further, the reproduction screen 43 is the case where it is determined that the DVD 2 data has been produced by an illegitimate route, and the display manner of data is limited in the areas 1 and 4 by solid shading. In the sixth embodiment, the reproduction screen of the monitor display 15 can be divided by various manners as in the second embodiment.

Referring to the flowchart of FIG. 20, the procedure of controlling the output of reproduced video data employed in the sixth embodiment will be described. This procedure is similar to that of the fifth embodiment except that in the former, the overlay surface-generating step S103 in FIG. 16 is replaced with an area-dividing step S113.

Specifically, video data 10 is input and decoded, and decoder certification is performed on the video data 10 (step S110 to S112). If the decoder certification result indicates that the video data 10 has been reproduced by an illegitimate route, the manner of displaying the decoded data on the monitor display 15 is limited (step S118). If the decoder certification result indicates that the video data 10 has been reproduced by a legitimate route, the reproduction screen of the monitor display 15 is divided into a plurality of areas (step S113). At this time, a video display area, such as an overlay surface, may be generated as in the fifth embodiment.

Each of the following steps S114 to S117 is executed for each area obtained by division at the step S113. Specifically, it is determined whether or not video data 10 contains digital watermark information. If the video data 10 contains no digital watermark information, decoded data is written into the video memory 13, while if the video data 10 contains digital watermark information, it is subjected to copy protection certification using the digital watermark information.

If copy protection certification has failed, the decoded data is written into the video memory 13, while if copy protection certification has succeeded, the manner of writing the decoded data into the video memory 13 is limited. The decoded data written into the video memory 13 is output to the monitor display 15.

Figure 21:
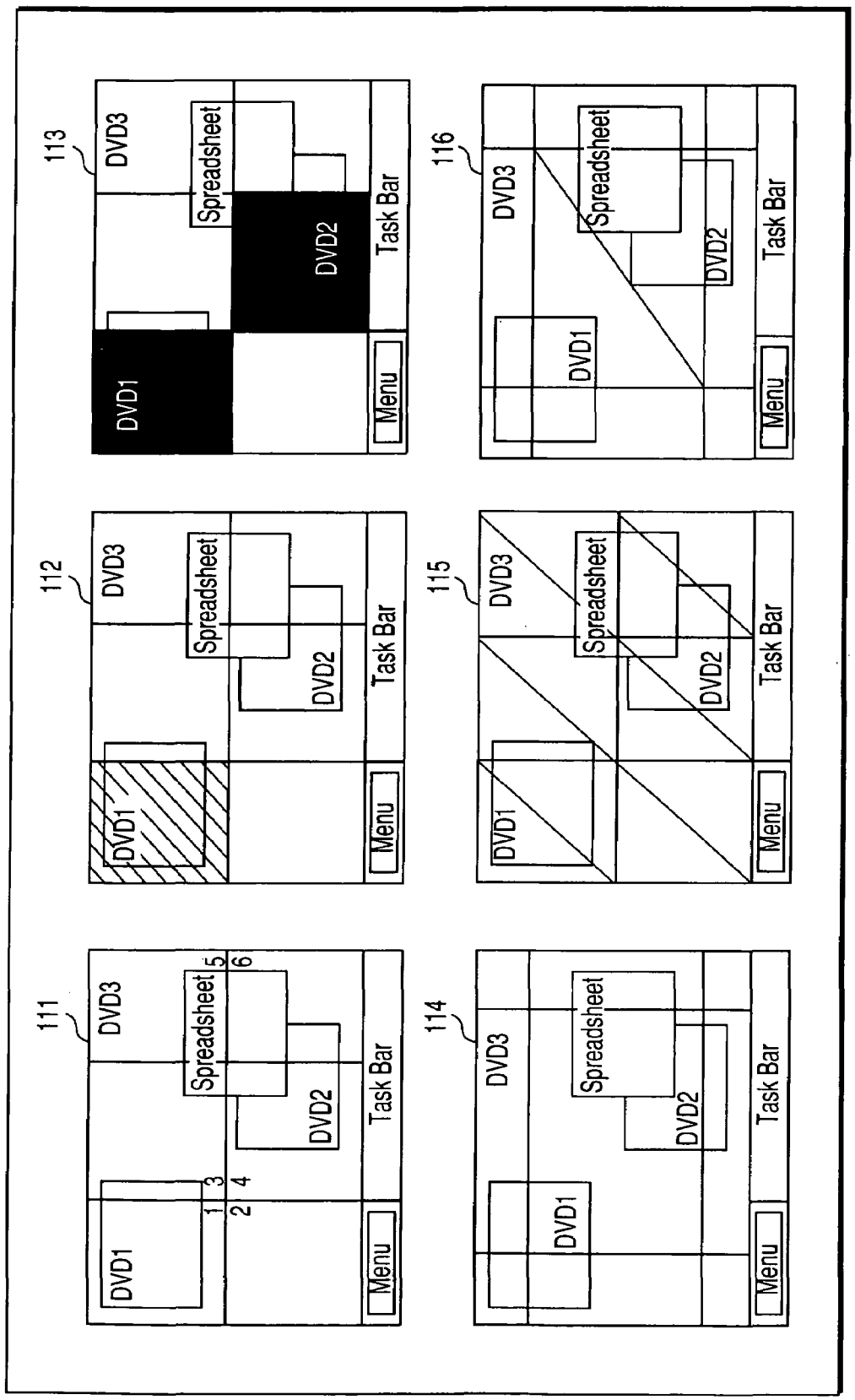
FIG. 21 is a view useful in explaining operation areas of the computer system of the sixth embodiment.

When the display manner of the decoded data is limited, this limitation may be performed on the data in the area of the reproduction screen of the monitor display 15 other than the operation areas for the computer system. For example, in reproduction screens 111 to 116 shown in FIG. 21, a task bar and system menu as operation areas are displayed on the lower portion of the screen. These operation areas can be used even after copy protection is performed. On the other hand, if the operation areas, such as the task bar, system menu, etc., are protected, the computer system cannot be operated. In light of this, the operation areas are not subjected to copy protection processing so that they can be always used.

Figure 22:
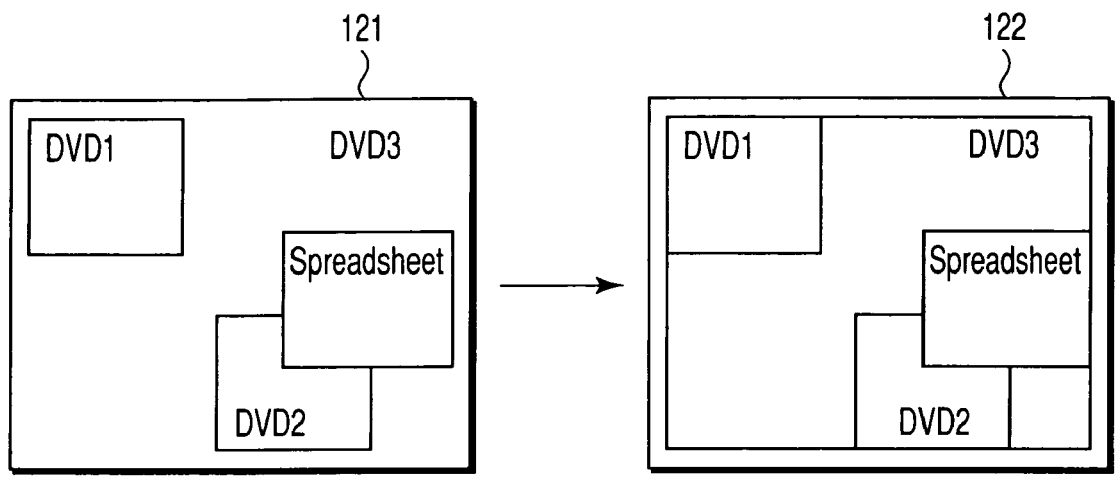
FIG. 22 is a view useful in explaining operation areas of the computer system of the sixth embodiment.

When the display manner of decoded data is limited, this limitation may be performed on the data in the area of the screen of the monitor display 15 other than the peripheral frame on the screen. For example, FIG. 22 shows a reproduction screen 121 similar to the reproduction screen 40 of FIG. 5, and a reproduction screen 122 obtained after display limitation is performed. In the reproduction screen 122 after the display limitation, a certain pattern of display limitation is performed inside the frame, while the system menu on the frame is displayed. Thus, it is considered that system operation areas, such as the system menu, are located on the peripheral frame of the screen. Therefore, even if the positions of the system operation areas are unknown, when copy protection processing is performed on the area except for the area corresponding to the peripheral frame as shown in the screen 122 of FIG. 22, and display limitation is performed on the area other than the operation areas, the operation areas can be always displayed.

Figure 23A:
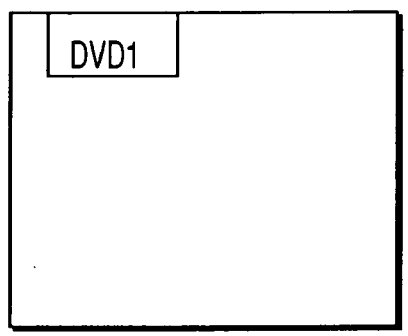
FIGS. 23A, 23B, 23C and 23D illustrate changes with lapse of time in division processing performed in the sixth embodiment.
Figure 23B:
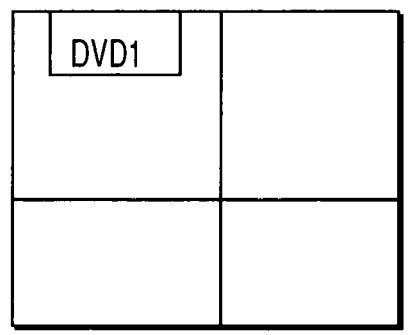
Figure 23C:
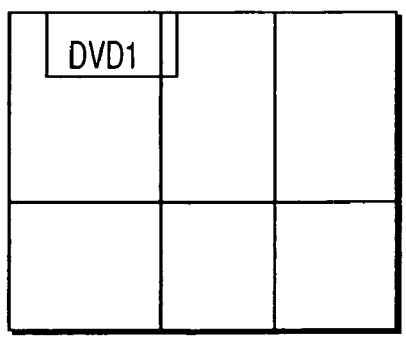
Figure 23D:
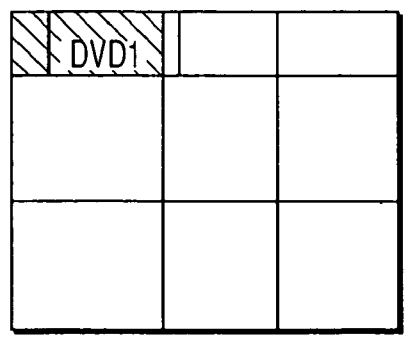

In the sixth embodiment, the manners shown in, for example, FIGS. 23A, 23B, 23C and 23D may be employed as those for changing the division areas with lapse of time. Firstly, as shown in FIG. 23A, it is determined whether or not the whole screen of the monitor display 15 contains digital watermark information. If no digital watermark information is detected, the screen is divided into four areas as shown in FIG. 23B, and it is determined whether or not each area contains digital watermark information. If no digital watermark information is detected in each area, the screen is divided into six areas as shown in FIG. 23C, thereby determining whether or not each area contains digital watermark information. These operations are repeated until each area thus obtained has a size smaller than a predetermined one.

In the examples shown in FIGS. 23A, 23B, 23C and 23D, DVD 1 video data that contains digital watermark information is reproduced. Digital watermark information is not found in each area of the examples of FIGS. 23A, 23B and 23C, but found in the area of the example of FIG. 23D indicated by hatching. Therefore, based on this digital watermark information, display limitation indicated by hatching is performed on the screen of the monitor display 15.

SEVENTH EMBODIMENT

Figure 24:
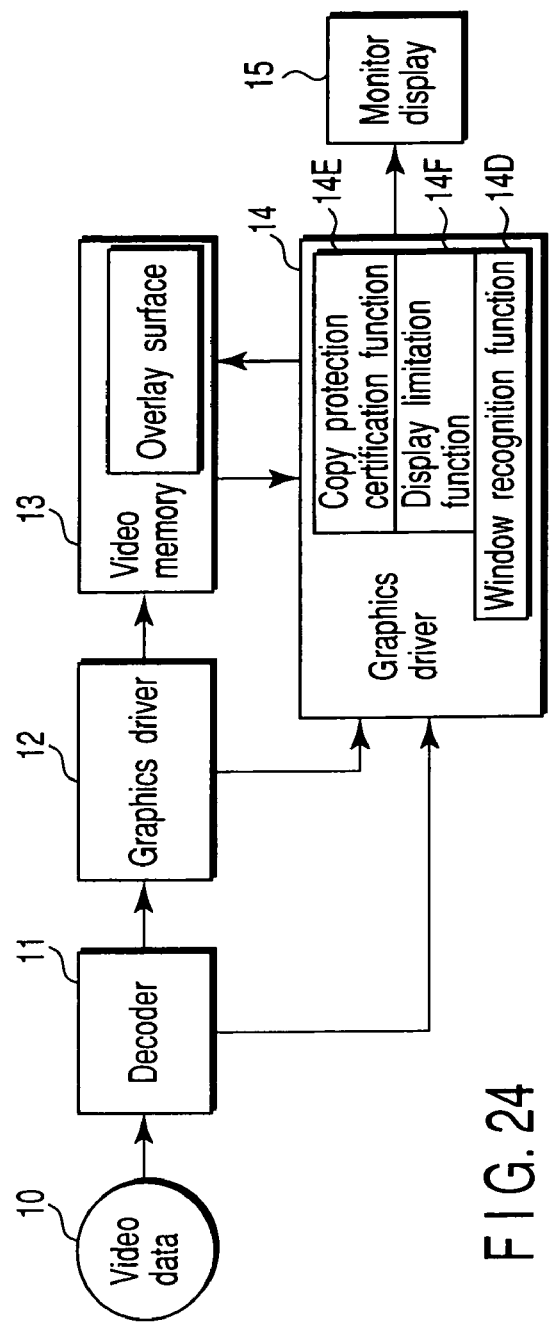
FIG. 24 is a block diagram illustrating the configuration of a computer system according to a seventh embodiment of the invention.

FIG. 24 is a block diagram illustrating the part of a computer system that relates to video reproduction and accords to a seventh embodiment of the invention. In FIG. 24, elements similar to those of FIG. 15 are denoted by corresponding reference numerals. In the seventh embodiment, the graphics controller 14 comprises a window recognition function 14D, as well as the copy protection certification function 14E and display limiting function 14F. Using the window recognition function 14D, the graphics controller 14 recognizes a window or windows on the reproduction screen of the monitor display 15 before reproducing video data on the display 15. After that, the controller 14 performs copy protection certification as to whether or not video data 10 in each recognized window should be protected from being copied, using digital watermark information detected from the video data 10. To recognize a window on the reproduction screen, various methods as employed in the third embodiment can be utilized.

If video data is directly written into the display video frame memory, decoder certification and copy protection certification are performed on the decoded data in the display video frame memory that corresponds to the output to the monitor display 15. If decoder certification has failed or copy protection certification has succeeded, the decoded data is output to the monitor display 15, with the manner of display limited. As a result, effective copy protection can be made.

Figure 25:
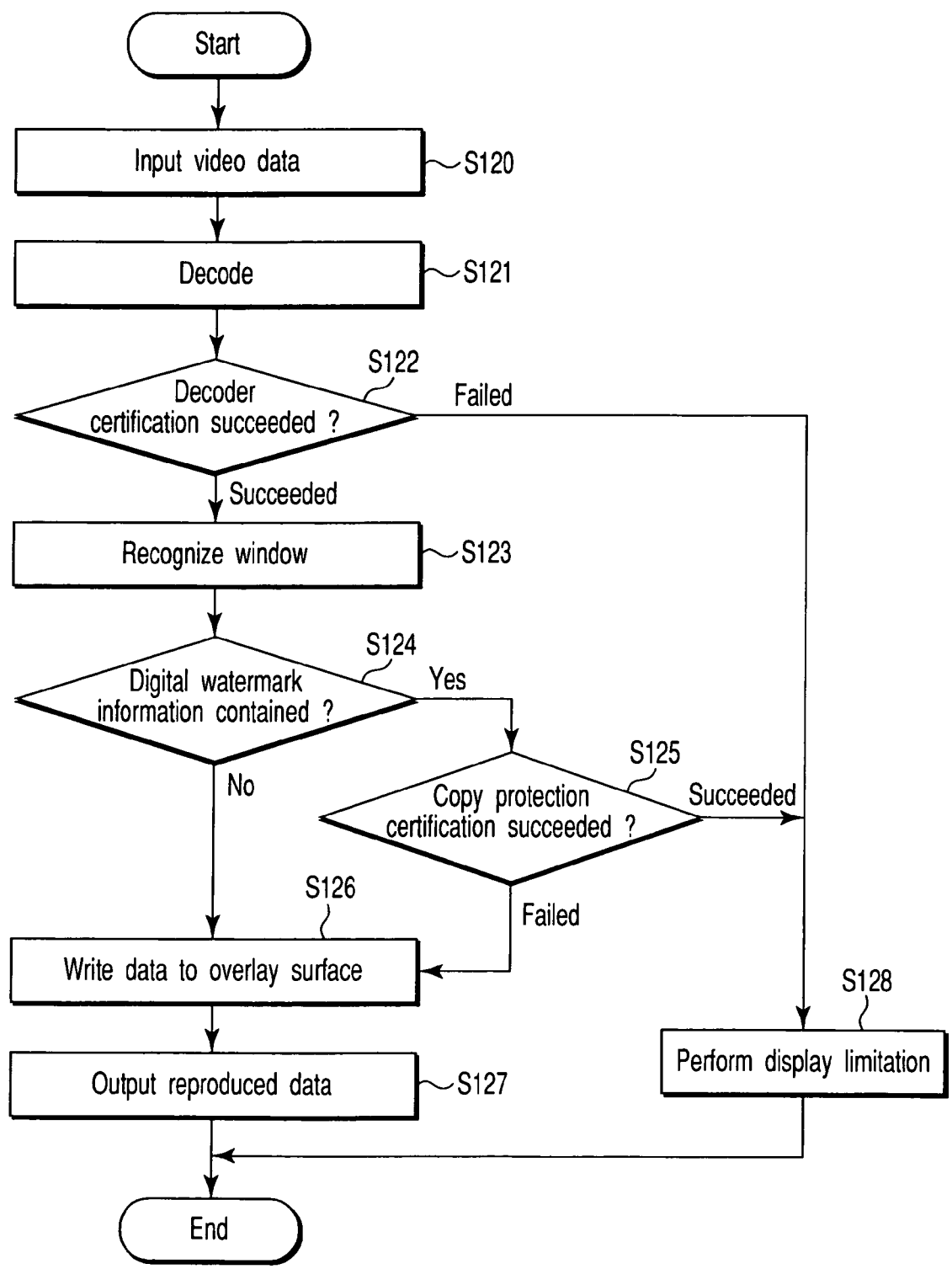
FIG. 25 is a flowchart illustrating the procedure of output control of reproduced video data in the seventh embodiment.

Referring to the flowchart of FIG. 25, a description will be given of the procedure of controlling the output of reproduced video data, employed in the seventh embodiment. The procedure of the seventh embodiment is similar to that of the fifth embodiment except that in the former, the overlay surface-generating step S103 in FIG. 16 is replaced with a window recognition step S123.

Firstly, video data 10 is input, decoded and subjected to decoder certification (steps S120 to S122). If the result of decoder certification indicates that the video data 10 has been reproduced by an illegitimate route, the manner of displaying the decoded data on the monitor display 15 is limited (step S128). If the decoder certification result indicates that the video data 10 has been reproduced by a legitimate route, the reproduction screen of the monitor display 15 is divided into a plurality of areas (step S123). At this time, a video display area, such as an overlay surface, may be generated as in the fifth embodiment.

Each of the following steps S124 to S127 is executed for each area obtained by division at the step S123. Specifically, it is determined whether or not video data 10 contains digital watermark information. If the video data 10 contains no digital watermark information, decoded data is written into the video memory 13, while if the video data 10 contains digital watermark information, it is subjected to copy protection certification using the digital watermark information. If copy protection certification has failed, the decoded data is written into the video memory 13, while if copy protection certification has succeeded, the manner of writing the decoded data into the video memory 13 is limited. The decoded data written into the video memory 13 is output to the monitor display 15.

EIGHTH EMBODIMENT

Figure 26:
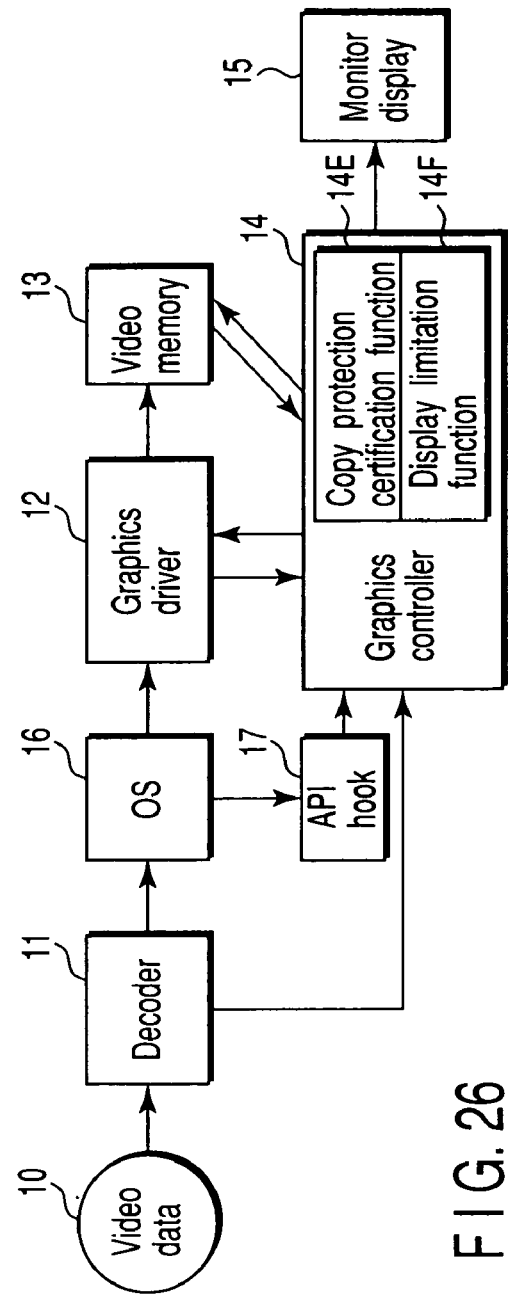
FIG. 26 is a block diagram illustrating the configuration of a computer system according to an eighth embodiment of the invention.

FIG. 26 is a block diagram illustrating the part of a computer system that relates to video reproduction and accords to an eighth embodiment of the invention. As seen from FIG. 26, the eighth embodiment is obtained by adding an operating system (OS) 16 and API hook unit 17 to the configuration of FIG. 15, as in the fourth embodiment. The basic operation of the eighth embodiment is the same as that of the fifth embodiment, and the operations of the OS 16 and API hook unit 17 are the same as those of the corresponding elements in the fourth embodiment. Therefore, no detailed description is given thereof.

The copy protection method employed in the fifth to seventh embodiments expects no supports from the OS 16, while the copy protection method employed in the eighth embodiment expects supports from the OS 16. When video data is reproduced, an imaging instruction API for flushing the screen and an imaging instruction API for window operation, etc. are utilized. When such an imaging instruction API is transferred to the graphics driver 12, the graphics controller 14 performs copy protection certification, and refers to the result of decoder certification. If decoder certification has failed or copy protection certification has succeeded, the video data is output to the monitor display 15 with the manner of display limited. Thus, copy protection can be performed effectively.

On the other hand, when the OS 16 is an open source, even if copy protection processing is performed on video data using a function (e.g., API function) of the OS, the video data may well be used illegally by analyzing the source. In light of this, an application for, for example, the decoder 11 may use an imaging instruction API that directly accesses the video memory 13, thereby directly connecting this application to the graphics controller 14 to enable the controller 14 to perform direct certification.

Figure 27:
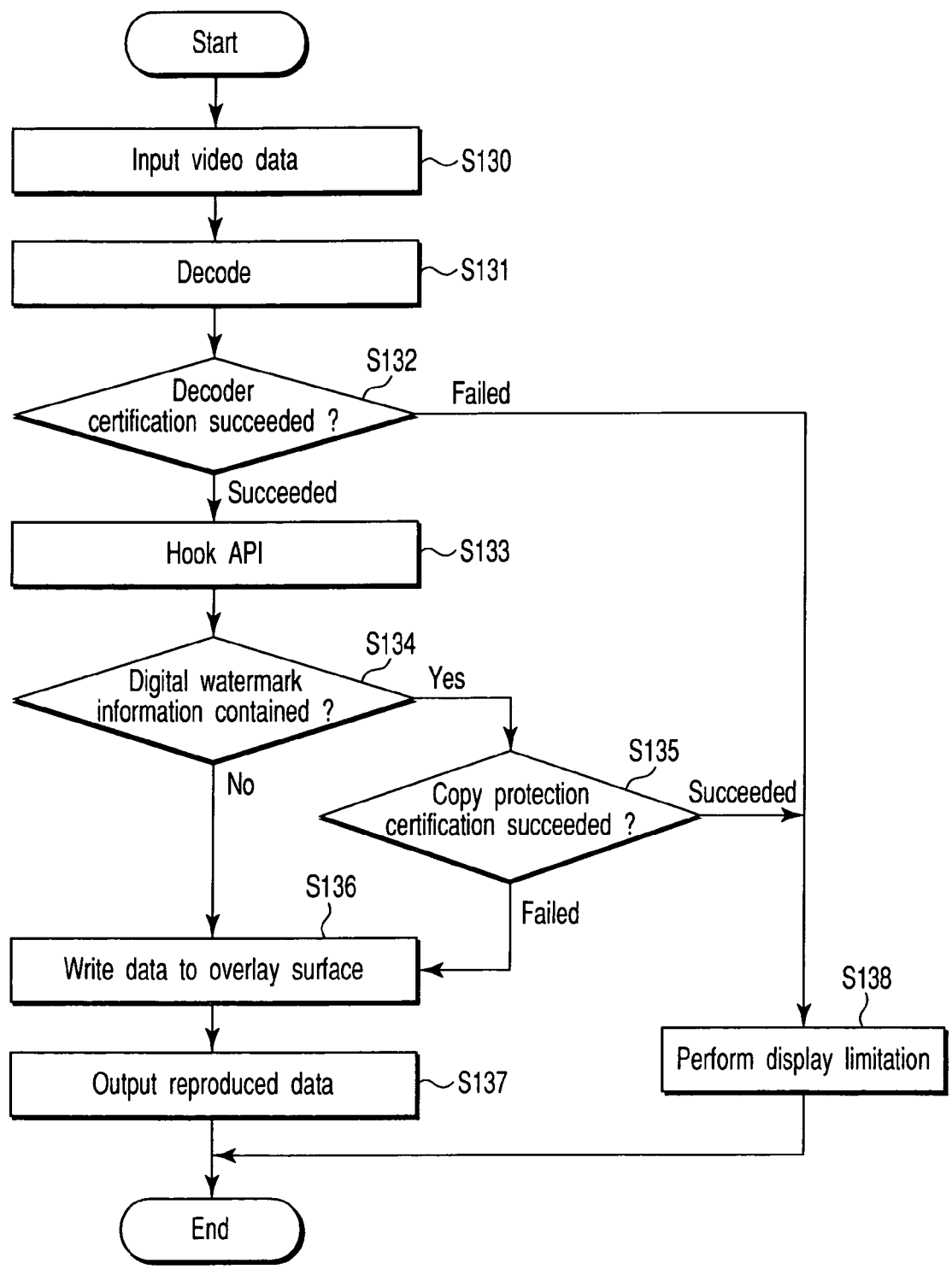
FIG. 27 is a flowchart illustrating the procedure of output control of reproduced video data in the eighth embodiment.

Referring to the flowchart of FIG. 27, the procedure of controlling the output of reproduced video data employed in the eighth embodiment will be described. This procedure is similar to that of the fifth embodiment except that in the former, the overlay surface-generating step S103 in FIG. 16 is replaced with an API hook step S133. Specifically, video data 10 is input and decoded by the decoder 11, and decoder certification is performed as to whether or not the video data 10 has been reproduced by a legitimate route (step S130 to S132). If the decoder certification has succeeded, the OS 16 hooks the imaging instruction API transferred to the graphics driver 12 (step S133). At this time, a video display area, such as an overlay surface, may be generated, as in the fifth embodiment.

After that, it is determined whether or not the video data 10 corresponding to the hooked imaging instruction API contains digital watermark information (step S134). If the video data 10 contains no digital watermark information, the decoded data is written into the video memory 13, whereas if the data 10 contains digital watermark information, copy protection certification is performed on the video data 10 using the digital watermark information (step S135). If the copy protection certification on the video data 10 has failed, the decoded data is written into the video memory 13, while if the copy protection certification on the video data 10 has succeeded, the manner of writing the decoded data into the video memory 13 is limited (step S136). Lastly, the decoded data stored in the video memory 13 is output to the monitor display 15 for reproduction (step S137).

The following manners, for example, may be employed for display limitation in the fifth to eighth embodiments:

(6-1) The brightness or color difference component in a target portion is changed;

(6-2) A noise line, such as a red line, is attached in a target portion;

(6-3) A plurality of thin noise lines are attached in a target portion;

(6-4) A target portion is solidly shaded in a single color;

(6-5) A target portion is covered with a mosaic pattern;

(6-6) The brightness or color difference component in a target portion is reversed; and (6-7) Output to a target portion is inhibited.

Assume, for example, that DVD 1 data, DVD 2 data and spreadsheet data are reproduced in respective windows on the reproduction screen of the monitor display 15, and DVD 3 data is directly reproduced on the screen, as is shown in FIG. 5. Further, assume that the reproduction screen is divided into three equal columns and two equal rows as shown in FIG. 6, using area-dividing method employed in the sixth embodiment.

The reproduction screen 42 of FIG. 6 is an example where it is necessary to perform display limitation on the data in area 1, and display limitation is performed by hatching. Further, the reproduction screen 43 of FIG. 6 is an example where it is necessary to perform display limitation on the data in areas 1 and 4, and display limitation is performed by solid black shading.

The following methods, for example, may be used for realizing different types of display limitation for a plurality of simultaneously reproduced video data items:

(1) Method for limiting the manner of displaying data items in respective areas in accordance with the states of the data items;

(2) Method for limiting the display manner based on the data whose display manner is to be limited in the most reliable manner;

(3) Method for limiting the display manner of the entire monitor display;

(4) Method for limiting the display manner of a data-reproducing area with high priority; and (5) Method for limiting the display manner of Macrovision and CGMS-A data in accordance with the data whose display manner is to be limited in the most reliable manner Assume, for example, that in the example of FIG. 5 where DVD 1 data, DVD 2 data and spreadsheet data are reproduced in respective windows displayed on the reproduction screen 40 of the monitor display 15, and DVD 3 data is reproduced directly on the screen 40, the reproduction screen is divided, by the area-dividing method employed in the sixth embodiment, into two rows and three columns like the reproduction screen 41 in FIG. 6. In FIG. 6, the reproduction screen 42 is an example where data in the area 1 should be protected from being copied, and is copy-prevented by hatching. In this case, data in each area is protected in accordance with the condition for each area. Similarly, the reproduction screen 43 is an example where data in the areas 1 and 4 should be protected from being copied. In this case, it is requested that data in the area 1 be copy-prevented by hatching, and data in the area 4 be copy-prevented based on Macrovision and CGMS-A. Therefore, data in the areas 1 and 4 is display-limited in the most reliable manner (i.e., by solid black shading). Further, like display limitation for simultaneous reproduction of a plurality of video data items, it is not always necessary to use the same type of display limitation between the case where the decoder 11 determines that data has been reproduced by an illegitimate route, and the case where copy protection certification performed by the graphics controller 14 has failed.

In each of the above-described embodiments, two-stage certification is performed—copy protection certification by the graphics controller 14, and certification performed by the decoder 11 as to whether data has been reproduced by a legitimate route. As a result, illegal copying can be effectively prevented.

Macrovision, color-stripe, CGMS-A, DTCP and CPRM schemes are used as copy protection schemes for images, while CSS and CPRM scheme are used as copy protection schemes for DVD files.

In the above-described embodiments, video data reproduced from a DVD is used as input video data 10. However, the recording medium for recording video data is not limited to DVDs, but may be magnetic disks such as flexible or hard disks, optical disks other than DVDs, such as CD-ROMs, or semiconductor memories. Further, the input video data 10 may be the data that can be transmitted through a communication medium, such as a network. However, when the monitor display is connected to a network to display an image transmitted via the network, if the image contains digital watermark information, the display of the image on the monitor display may be inhibited. Alternatively, the display manner may be limited. This is because the existing IP communication system cannot protect image information from being copied.

Furthermore, the copy protection method of the invention can be utilized even when the monitor display is used, rotated. In this case, the rotation of the monitor display is monitored.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A computer system with a monitor display, comprising:
   a decoder unit configured to decode video data containing digital watermark information to derive decoded data, and configured to determine, based on information included in the video data, whether or not first certification for certifying that the video data is legitimately reproduced data succeeds; and
   a graphics controller which determines, using the digital watermark information, whether or not second certification for certifying that the video data is to be protected from being copied succeeds,
      the graphics controller converting the decoded data into a protected decoded data from being copied and outputting the protected decoded data to the monitor display if the first certification and the second certification succeed, and
      the graphics controller inhibiting the decoded data from being output to the monitor display if the first certification fails and the second certification succeeds.

2. The computer system according to claim 1, further comprising a video memory including a video display area corresponding to the video data and storing the decoded data in the video display area, and outputting the decoded data to the monitor display under control of the graphics controller,
   wherein the graphics controller performs the second certification when the video display area is formed, writes the protected decoded data in the video display area if the first certification and the second certification succeed.

3. The computer system according to claim 1, wherein the graphics controller divides a screen of the monitor display into a plurality of areas, and performs the second certification for each of the areas.

4. The computer system according to claim 1, wherein the graphics controller recognizes a plurality of windows on a screen of the monitor display, and performs the second certification for each of recognized windows, using the digital watermark information detected from video data corresponding to said each recognized window.

5. The computer system incorporating an operating system and according to claim 1, further comprising:
   a graphics driver which activates the graphics controller; and
   an API (Application Programming Interface) hook unit configured to hook, when the operating system incorporated in the computer system executes an imaging instruction API, the imaging instruction API to be transferred to the graphics driver, the API hook unit transferring information contained in a hooked imaging instruction API to the graphics controller, the hooked imaging instruction API corresponding to the video data,
   the graphics controller performing the second certification on the video data corresponding to the hooked imaging instruction API.

6. A method of controlling output of reproduced video data, comprising:
   decoding video data containing digital watermark information to derive decoded data;
   determining, based on information included in the video data, whether or not first certification for certifying that the video data has been reproduced by a legitimate route succeeds;
   forming a video display area in a video memory at a position corresponding to the video data, the video display area storing the decoded data;
   determining, using the digital watermark information, whether or not second certification for certifying that the video data is to be protected from being copied succeeds, if the video display area is formed;
   converting the decoded data into a protected decoded data from being copied and writing the protected decoded data in the video display area if the first certification and the second certification succeed, and inhibiting the decoded data from being written in the video display area if the first certification fails and the second certification succeeds; and
   outputting, to a monitor display for reproduction, the protected decoded data stored in the video display area in the video memory.

7. A method of controlling output of reproduced video data to a monitor display, comprising:
   decoding video data containing digital watermark information to derive decoded data;
   determining, based on information included in the video data, whether or not first certification for certifying that the video data has been reproduced by a legitimate route succeeds;
   dividing a screen of the monitor display into a plurality of areas;
   determining, for each of the areas using the digital watermark information, whether or not second certification for certifying that the video data is to be protected from being copied succeeds; and
   converting the decoded data into a protected decoded data from being copied and outputting the protected decoded data to the monitor display if the first certification and the second certification succeed, and inhibiting the decoded data from being output to the monitor display if the first certification fails and the second certification succeeds.

8. A method of controlling output of reproduced video data to a monitor display, comprising:
- decoding video data containing digital watermark information to derive decoded data;
- determining, based on information included in the video data, whether or not first certification for certifying that the video data has been reproduced by a legitimate route succeeds;
- recognizing a plurality of windows on a screen of the monitor display;
- determining, for each of recognized windows using the digital watermark information, whether or not second certification for certifying that the video data is to be protected from being copied succeeds; and
- converting the decoded data into a protected decoded data from being copied and outputting the protected decoded data to the monitor display if the first certification and the second certification succeed, and inhibiting the decoded data from being output to the monitor display if the first certification fails and the second certification succeeds.

9. A method of controlling output of reproduced video data to a monitor display, comprising:
- decoding video data containing digital watermark information to derive decoded data;
- determining, based on information included in the video data, whether or not first certification for certifying that the video data has been reproduced by a legitimate route succeeds;
- hooking an imaging instruction API (Application Programming Interface) to be transferred from an operating system to a graphics driver, the hooked imaging instruction API corresponding to the video data;
- determining whether or not second certification for certifying that the video data is to be protected from being copied succeeds, using the digital watermark information; and
- converting the decoded data into a protected decoded data from being copied and outputting the protected decoded data to the monitor display if the first certification and the second certification succeed, and inhibiting the decoded data from being output to the monitor display if the first certification fails and the second certification succeeds.

10. A computer system with a monitor display, comprising:
- a decoder unit configured to decode video data to derive decoded data and configured to determine, based on information included in the video data, whether or not first certification for certifying that the video data is legitimately reproduced data succeeds; and
- a graphics controller which determines whether or not the video data contains digital watermark information if the first certification succeeds,
- the graphics controller determining, using the digital watermark information, whether or not second certification for certifying that the video data is to be protected from being copied succeeds,
- the graphics controller outputting decoded data to the monitor display in success of the first certification and failure of the second certification, and
- the graphics controller limiting a manner of displaying the decoded data on the monitor display in one of failure of the first certification and success of the second certification.

11. The computer system according to claim 10, wherein the graphics controller limits the manner of displaying the decoded data in an area of a screen of the monitor display other than an operation area of the screen.

12. The computer system according to claim 10, wherein the graphics controller limits the manner of displaying the decoded data in an area of a screen of the monitor display other than a frame displayed on the screen.

13. The computer system according to claim 10, further comprising a video memory including a video display area corresponding to the video data and storing the decoded data, the video memory outputting the decoded data to the monitor display under control of the graphics controller, if the first certification succeeds,
- wherein the graphics controller performs the second certification when the video display area is formed, limits a manner of writing the decoded data in the video display area if the second certification succeeds, and writes the decoded data in the video display area if the second certification fails.

14. The computer system according to claim 13, wherein the graphics controller limits the manner of writing the decoded data in the video display area if video data that the second certification succeeds is superimposed upon video data that the second certification fails.

15. The computer system according to claim 10, further comprising a video memory including a video display area corresponding to the video data and storing the decoded data, the video memory outputting the decoded data to the monitor display under control of the graphics controller,
- wherein the graphics controller performs the second certification when the video display area is formed, limits a manner of writing the decoded data in the video display area by changing a value in the video memory if the second certification succeeds, and writes the decoded data in the video display area if the second certification fails.

16. The computer system according to claim 10, further comprising a video memory including a video display area corresponding to the video data and storing the decoded data, the video memory outputting the decoded data to the monitor display under control of the graphics controller,
- wherein the graphics controller performs the second certification when the video display area is formed, limits a manner of writing the decoded data in the video display area if the second certification succeeds, and writes the decoded data in the video display area if the second certification fails, and changes a display area for the decoded data on the monitor display if the second certification succeeds.

17. The computer system according to claim 10, wherein the graphics controller divides a screen of the monitor display into a plurality of areas, and determines, for each of the areas, whether or not the video data contains digital watermark information.

18. The computer system according to claim 10, wherein the graphics controller divides a screen of the monitor display into a plurality of areas, determines, for each of the areas, whether or not the video data contains the digital watermark information, and limits the manner of displaying the decoded data in an area of the screen of the monitor display other than an operation area of the screen.

19. The computer system according to claim 10, wherein the graphics controller divides a screen of the monitor display into a plurality of areas, determines, for each of the areas, whether or not the video data contains the digital watermark information, and limits the manner of displaying the decoded data in an area of the screen of the monitor display other than a frame displayed on the screen.

20. The computer system according to claim 10, wherein the graphics controller recognizes a plurality of windows on a screen of the monitor display, determines, for each of recognized windows, whether or not the video data contains the digital watermark information, and performs the second certification using the digital watermark information detected from video data corresponding to said each recognized window.

21. The computer system incorporating an operating system and according to claim 10, further comprising:
a graphics driver which activates the graphics controller; and
an API (Application Programming Interface) hook unit configured to hook, when the operating system incorporated in the computer system executes an imaging instruction API, the imaging instruction API to be transferred to the graphics driver, the API hook unit transferring information contained in a hooked imaging instruction API to the graphics controller, the hooked imaging instruction API corresponding to the video data,
wherein the graphics controller determines whether or not the video data contains the digital watermark information.

22. A method of controlling output of reproduced video data to a monitor display, comprising:
decoding video data to derive decoded data;
determining, based on information included in the video data, whether or not first certification for certifying that the video data has been reproduced by a legitimate route succeeds;
limiting a manner of displaying the decoded data on the monitor display if the first certification fails;
determining whether or not the video data contains digital watermark information, if the first certification succeeds;
forming a video display area on a video memory at a position corresponding to the video data, the video display area storing the decoded data;
writing the decoded data in the video display area if the video data fails to contain the digital watermark information;
determining, using the digital watermark information, whether or not second certification for certifying that the video data is to be protected from being copied succeeds, if the video data contains the digital watermark information;
writing the decoded data in the video display area if the second certification fails;
limiting a manner of writing the decoded data in the video display area if the second certification succeeds; and
outputting, to the monitor display for reproduction, the decoded data stored in the video display area.

23. The method according to claim 22, wherein the graphics controller limits the manner of writing the decoded data in the video display area if video data that the second certification succeeds is superimposed upon video data that the second certification fails.

24. A method of controlling output of reproduced video data to a monitor display, comprising:
decoding video data to derive decoded data;
determining, based on information included in the video data, whether or not first certification for certifying that the video data has been reproduced by a legitimate route succeeds;
limiting a manner of displaying the decoded data on the monitor display if the first certification fails;
dividing a screen of the monitor display into a plurality of areas if the first certification succeeds;
determining, for each of the areas, whether or not the video data contains digital watermark information;
outputting the decoded data to the monitor display if the video data fails to contain the digital watermark information;
determining, for each of the areas using the digital watermark information, whether or not second certification for certifying that the video data is to be protected from being copied succeeds, if the video data contains the digital watermark information;
outputting the decoded data to the monitor display for reproduction if the second certification fails; and
limiting a manner of displaying the decoded data on the monitor display if the second certification succeeds.

25. The method according to claim 24, wherein limiting the manner of displaying the decoded data is performed in an area of a screen of the monitor display other than an operation area of the screen.

26. The method according to claim 24, wherein limiting the manner of displaying the decoded data is performed in an area of a screen of the monitor display other than a frame displayed on the screen.

27. A method of controlling output of reproduced video data to a monitor display, comprising:
decoding video data to derive decoded data;
determining, based on information included in the video data, whether or not first certification for certifying that the video data has been reproduced by a legitimate route succeeds;
limiting a manner of displaying the decoded data on the monitor display if the first certification fails;
recognizing a plurality of windows on a screen of the monitor display if the first certification succeeds;
determining, for each of the recognized windows, whether or not the video data contains digital watermark information;
outputting the decoded data to the monitor display if the video data fails to contain the digital watermark information;
determining, for each of the recognized windows using the digital watermark information, whether or not second certification for certifying that the video data is to be protected from being copied succeeds, if the video data contains the digital watermark information;
outputting the decoded data to the monitor display for reproduction if the second certification fails; and
limiting a manner of displaying the decoded data on the monitor display if the second certification succeeds.

28. A method of controlling output of reproduced video data to a monitor display, comprising:
decoding video data to derive decoded data;
determining, based on information included in the video data, whether or not first certification for certifying that the video data has been reproduced by a legitimate route succeeds;
limiting a manner of displaying the decoded data on the monitor display if the first certification fails;

hooking an imaging instruction API (Application Programming Interface) transferred from an operating system to a graphics driver, if the first certification succeeds;

determining whether or not the video data contains digital watermark information;

outputting the decoded data to the monitor display if the video data fails to contain the digital watermark information;

determining, using the digital watermark information, whether or not second certification for certifying that the video data corresponding to the hooked imaging instruction API is to be protected from being copied succeeds, if the video data contains the digital watermark information;

outputting the decoded data to the monitor display for reproduction if the second certification fails; and limiting a manner of displaying the decoded data on the monitor display if the second certification succeeds.

* * * * *